United States Patent
Ostendorf et al.

(10) Patent No.: US 11,965,094 B2
(45) Date of Patent: Apr. 23, 2024

(54) CURABLE ORGANOPOLYSILOXANE COMPOSITIONS

(71) Applicant: WACKER CHEMIE AG, Munich (DE)

(72) Inventors: Detlev Ostendorf, Dresden (DE); Steffen Doerrich, Munich (DE); Marko Prasse, Glaubitz (DE)

(73) Assignee: Wacker Chemie AG, Munich (DE)

( * ) Notice: Subject to any disclaimer, the term of this patent is extended or adjusted under 35 U.S.C. 154(b) by 424 days.

(21) Appl. No.: 16/961,524

(22) PCT Filed: Oct. 26, 2018

(86) PCT No.: PCT/EP2018/079419
§ 371 (c)(1),
(2) Date: Jul. 10, 2020

(87) PCT Pub. No.: WO2020/083506
PCT Pub. Date: Apr. 30, 2020

(65) Prior Publication Data
US 2021/0238416 A1    Aug. 5, 2021

(51) Int. Cl.
| | | |
|---|---|---|
| *C08L 83/04* | (2006.01) | |
| *C04B 20/00* | (2006.01) | |
| *C04B 24/12* | (2006.01) | |
| *C04B 26/32* | (2006.01) | |
| *C08G 77/18* | (2006.01) | |
| *C08G 77/20* | (2006.01) | |
| *C08J 5/10* | (2006.01) | |
| *C08K 3/36* | (2006.01) | |
| *C08K 5/101* | (2006.01) | |
| *C08K 5/11* | (2006.01) | |
| *C08K 5/14* | (2006.01) | |
| *C08K 5/17* | (2006.01) | |
| *C08K 7/02* | (2006.01) | |
| *C08K 9/06* | (2006.01) | |
| *C08L 43/04* | (2006.01) | |

(52) U.S. Cl.
CPC .......... *C08L 83/04* (2013.01); *C04B 20/0048* (2013.01); *C04B 24/121* (2013.01); *C04B 26/32* (2013.01); *C08G 77/18* (2013.01); *C08G 77/20* (2013.01); *C08J 5/10* (2013.01); *C08K 3/36* (2013.01); *C08K 5/101* (2013.01); *C08K 5/11* (2013.01); *C08K 5/14* (2013.01); *C08K 5/17* (2013.01); *C08K 7/02* (2013.01); *C08K 9/06* (2013.01); *C08J 2383/06* (2013.01); *C08L 43/04* (2013.01)

(58) Field of Classification Search
CPC ........ C08L 83/04; C08L 43/04; C04B 24/121; C08G 77/20
See application file for complete search history.

(56) References Cited

U.S. PATENT DOCUMENTS

| 8,039,539 B2 | 10/2011 | Pfeiffer et al. |
|---|---|---|
| 8,492,450 B2 | 7/2013 | Araki et al. |
| 9,862,642 B2 | 1/2018 | Ostendorf et al. |
| 11,421,108 B2 * | 8/2022 | Prasse .................... C04B 30/02 |
| 2016/0207832 A1 | 7/2016 | Ostendorf et al. |

FOREIGN PATENT DOCUMENTS

| CN | 101730669 A | | 6/2010 |
|---|---|---|---|
| CN | 103211712 A | * | 7/2013 |
| CN | 104011118 A | | 8/2014 |
| DE | 102013114061 A1 | | 6/2015 |
| EP | 2985318 B1 | | 3/2017 |
| JP | 2915480 B2 | * | 7/1999 |
| JP | 2002167552 A | | 6/2002 |
| WO | 2010061744 A1 | | 6/2010 |
| WO | 2015028296 A1 | | 3/2015 |

OTHER PUBLICATIONS

Machine Translation of CN_103211712_A obtained from PE2E (Year: 2013).*
Machine translation of JP 2915480 B2 obtained from IP.com (Year: 1999).*

* cited by examiner

*Primary Examiner* — Kregg T Brooks
*Assistant Examiner* — David R. Foss
(74) *Attorney, Agent, or Firm* — Brooks Kushman P.C.

(57) ABSTRACT

Curable organopolysiloxane compositions contain
  (A) organopolysiloxane resins consisting of units of the formula $$R_a R^1_b (OR^2)_c SiO_{(4-a-b-c)/2} \quad (I),$$

with the proviso that in formula (I) the sum of $a+b+c \leq 3$, in at least one unit of the formula (I) $b=1$, in at least 50% of the units of the formula (I) $a+b=1$ and in at most 10% of the units of the formula (I) $a+b=3$, based in each case on all siloxane units of the formula (I) in organopolysiloxane resin (A),
  (B) organic compounds having at least one unit of the formula $$CR^3_2=CR^3-CO-Z- \quad (II),$$

(C) initiators,
  (D) fillers and
  (K) amines,
wherein the radicals and indices have the definition specified in claim 1. When coarse and fine grained fillers are employed, the composition can be used to mold artificial stone.

17 Claims, No Drawings

CURABLE ORGANOPOLYSILOXANE COMPOSITIONS

CROSS REFERENCE TO RELATED APPLICATIONS

This application is the U.S. National Phase of PCT Appln. No. PCT/EP2018/079419 filed Oct. 26, 2018, the disclosure of which is incorporated in its entirety by reference herein.

BACKGROUND OF THE INVENTION

1. Field of the Invention

The present invention relates to curable organopolysiloxane compositions, which comprise silicone resins having at least one aliphatic carbon-carbon multiple bond, compounds having aliphatic carbon-carbon double bonds, and amines, to the preparation thereof, and to the use thereof.

2. Description of the Related Art

Mixtures of polyorganosiloxanes having SiC-bonded alkenyl groups capable of free radical reaction, and fillers, are already known. For example, WO 2015/028296 describes compositions for producing artificial stone, which may comprise as binder, inter alia, free radically crosslinking organosilicon compounds having polymerizable aliphatic carbon-carbon double bonds.

Mixtures of organopolysiloxane resins comprising polymerizable aliphatic carbon-carbon double bonds and acrylates or methacrylates as reactive plasticizers, for use as binders in artificial stone have not been described to date. However, compositions of organopolysiloxane resins, acrylates or methacrylates and fillers have the disadvantage that they exhibit pseudoplastic flow behavior, i.e. high viscosity at low shear rates and vice versa, and that with increasing degree of filling, the starting viscosity increases sharply such that such mixtures are more difficult to process at low shear rates.

SUMMARY OF THE INVENTION

The invention relates to curable organopolysiloxane compositions containing at least one silicone resin containing aliphatic unsaturation, at least one $CR^3_2=CR^3-CO-Z-$ group-containing organic compound, initiators, fillers, and amines.

DETAILED DESCRIPTION OF THE PREFERRED EMBODIMENTS

The invention thus relates to compositions comprising
(A) organopolysiloxane resins consisting of units of the general formula $$R_a R^1_b (OR^2)_c SiO_{(4-a-b-c)/2} \quad (I),$$

wherein
R may be the same or different and is a hydrogen atom or a monovalent, SiC-bonded, optionally substituted hydrocarbon radical free of aliphatic carbon-carbon multiple bonds,
$R^1$ may be the same or different and is a monovalent, SiC-bonded, optionally substituted hydrocarbon radical having aliphatic carbon-carbon multiple bonds,
$R^2$ may be the same or different and is a hydrogen atom or a monovalent, optionally substituted hydrocarbon radicals,
a is 0, 1, 2 or 3,
b is 0 or 1 and
c is 0, 1, 2 or 3,
with the proviso that in formula (I) the sum of a+b+c≤3, in at least one unit of the formula (I) b=1, in at least 50%, preferably at least 60%, more preferably at least 80%, and especially at least 90%, of the units of the formula (I) a+b=1, and in at most 10%, preferably at most 8%, more preferably at most 6%, of the units of the formula (I) a+b=3, based in each 10 case on all siloxane units of the formula (I) in organopolysiloxane resin (A),
(B) organic compounds having at least one unit of the formula $$CR^3_2=CR^3-CO-Z- \quad (II),$$

wherein
$R^3$ may be the same or different and is a hydrogen atom, cyano radical —CN or a monovalent, optionally substituted hydrocarbon radical, which may be interrupted by heteroatoms,
Z may be the same or different and is —O— or —$NR^5$— and
$R^5$ may be the same or different and is a hydrogen atom or a monovalent, optionally substituted hydrocarbon radical, which may be interrupted by heteroatoms,
(C) initiators,
(D) fillers and
(K) amines.

Examples of monovalent, SiC-bonded hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,4,4-trimethylpentyl and the 2,2,4-trimethylpentyl radical; nonyl radicals such as the n-nonyl radical; decyl radicals such as the n-decyl radical; dodecyl radicals such as the n-dodecyl radical; hexadecyl radicals such as the n-hexadecyl radical; octadecyl radicals such as the n-octadecyl radical; cycloalkyl radicals such as the cyclopentyl, cyclohexyl, cycloheptyl and methylcyclohexyl radicals; aryl radicals such as the phenyl, biphenylyl, naphthyl, anthryl and phenanthryl radicals; alkaryl radicals such as the o-, m-, p-tolyl radicals, xylyl radicals, and ethylphenyl radicals; and aralkyl radicals such as the benzyl radical, and the α- and the β-phenylethyl radicals.

Examples of monovalent, SiC-bonded, substituted hydrocarbon radicals R are 3-(O-methyl-N-carbamato)propyl, O-methyl-N-carbamatomethyl, 3-glycidoxypropyl, isocyanatomethyl, 3-isocyanatopropyl, succinic anhydride, 2-(3,4-epoxycyclohexyl)ethyl, 3-mercaptopropyl and the 3-chloropropyl radical.

The radicals R are preferably monovalent, SiC-bonded, hydrocarbon radicals having 1 to 18 carbon atoms free of aliphatic carbon-carbon multiple bonds, more preferably alkyl or aryl radicals having 1 to 8 carbon atoms, especially the methyl radical.

Examples of monovalent, SiC-bonded, optionally substituted, radicals $R^1$ comprising aliphatic carbon-carbon multiple bonds are vinyl, 1-propenyl, 2-propenyl, n-5-hexenyl, 2-(3-cyclohexenyl)ethyl, 7-octenyl, 10-undecenyl, 4-vinylcyclohexyl, 3-norbornenyl, 2-bornenyl, 4-vinylphenyl, methacryloxymethyl, acryloxyethyl, methacryloxyethyl, acryloxymethyl, 3-methacryloxypropyl and 3-acryloxypropyl radicals.

The radicals $R^1$ are preferably monovalent, SiC-bonded, hydrocarbon radicals having 1 to 18 carbon atoms, comprising aliphatic carbon-carbon double bonds, optionally substituted with acryloxy, methacryloxy, allyloxy or vinyloxy radicals, more preferably the vinyl, methacryloxymethyl, acryloxymethyl, 3-methacryloxypropyl or 3-acryloxypropyl radicals, and especially the vinyl or the 3-methacryloxypropyl radical, most preferably the vinyl radical.

The organopolysiloxane resins (A) according to the invention may have only one type of radical $R^1$ or two or more different radicals $R^1$, wherein preferably the sum of the units of the formula (I) where $R^1$=vinyl radical is at least 80%, more preferably at least 90%, and especially at least 95%, based on all units of the formula (I) where b=1.

Examples of radicals $R^2$ are the radicals specified for radical R and $R^1$.

The radicals $R^2$ are preferably hydrogen or monovalent hydrocarbon radicals having 1 to 18 carbon atoms, more preferably hydrogen, the methyl, ethyl, n-propyl, isopropyl, n-butyl, sec-butyl, tert-butyl or isobutyl radicals, and especially hydrogen and the methyl or the ethyl radicals.

In the resin (A) used in accordance with the invention, the sum of the units of the formula (I) where b=1 is preferably 10% to 40%, more preferably 15% to 35%, especially 15% to 30%.

In the resin (A) used in accordance with the invention, the sum of the units of the formula (I) where a+b=2 is preferably at most 30%, more preferably at most 20%, still more preferably at most 10%, especially at most 5%, based in each case on the sum of all siloxane units of the formula (I).

In the resin (A) used in accordance with the invention, the sum of the units of the formula (I) where c≠0 is preferably 5% to 55%, more preferably 15% to 50%, yet more preferably 25% to 45%, and especially 30% to 40%, based in each case on the sum of all siloxane units of the formula (I).

The resins (A) used in accordance with the invention preferably consist of on average at least 12, more preferably on average at least 15, especially on average at least 18, and most preferably on average 18 to 50 units of the formula (I).

In organopolysiloxane resin (A), the units of the formula (I) are preferably statistically distributed.

Preferred examples of organopolysiloxane resins (A) are compounds (A) obtainable by cohydrolysis of tetraethoxysilane, organyltriethoxysilanes, diorganyldiethoxysilanes and/or triorganylethoxysilanes with water, which preferably comprise average at least 12, more preferably on average at least 15, and most preferably on average at least 18 silicon atoms per molecule. In place of the ethoxysilanes mentioned above, the corresponding methoxysilanes can also be used for the preparation, wherein organylmethoxypolysiloxanes are then obtainable. However, mixtures of ethoxysilanes and methoxysilanes can also be used, wherein organylmethoxyethoxypolysiloxane resins are then obtainable. After the cohydrolysis, the reaction mixture is preferably neutralized, for example with an alkali metal hydroxide or alkali metal alkoxide solution, and volatile components such as residual water, alcohol and silanes or volatile siloxanes are distilled off. After the co-hydrolysis or after the distillative work-up, most preferably after the co-hydrolysis, the reaction mixture is preferably neutralized so that the residual acid content in particular in organopolysiloxane resin (A) is 0 to 30 ppm.

Preferred examples of such organopolysiloxane resins (A) used in accordance with the invention are $(MeSiO_{3/2})_{0.48}(ViSiO_{3/2})_{0.12}(Me(MeO)SiO_{2/2})_{0.26}(Vi(MeO)SiO_{2/2})_{0.07}(Me(HO)SiO_{2/2})_{0.02}(Me_2SiO_{2/2})_{0.01}(Me(MeO)_2SiO_{1/2})_{0.01}(Me_3SiO_{1/2})_{0.03}$ with a number average molar mass Mn of 1860 g/mol and a weight average molar mass Mw of 4860 g/mol, $(MeSiO_{3/2})_{0.36}(ViSiO_{3/2})_{0.09}(Me(MeO)SiO_{2/2})_{0.39}(Vi(MeO)SiO_{2/2})_{0.10}(Me(HO)SiO_{2/2})_{0.02}(Me_2SiO_{2/2})_{0.01}(Me(MeO)_2SiO_{1/2})_{0.03}$ with a number average molar mass Mn of 1680 g/mol and a weight average molar mass Mw of 4340 g/mol, $(MeSiO_{3/2})_{0.40}(ViSiO_{3/2})_{0.10}(Me(MeO)SiO_{2/2})_{0.34}(Vi(MeO)SiO_{2/2})_{0.08}(Me(HO)SiO_{2/2})_{0.02}(Me_2SiO_{2/2})_{0.01}(Me(MeO)_2SiO_{1/2})_{0.02}(Me_3SiO_{1/2})_{0.03}$ with a number average molar mass Mn of 1640 g/mol and a weight average molar mass Mw of 4080 g/mol, $(MeSiO_{3/2})_{0.44}(MaSiO_{3/2})_{0.11}(Me(MeO)SiO_{2/2})_{0.28}(Ma(MeO)SiO_{2/2})_{0.07}(Me(HO)SiO_{2/2})_{0.02}(Ma(HO)SiO_{2/2})_{0.01}(Me_2SiO_{2/2})_{0.01}(Me(MeO)_2SiO_{1/2})_{0.03}(Me_3SiO_{1/2})_{0.03}$ with a number average molar mass Mn of 1710 g/mol and a weight average molar mass Mw of 4700 g/mol, $(MeSiO_{3/2})_{0.48}(ViSiO_{3/2})_{0.12}(Me(MeO)SiO_{2/2})_{0.26}(Vi(MeO)SiO_{2/2})_{0.07}(Me(HO)SiO_{2/2})_{0.02}(Me_2SiO_{2/2})_{0.03}(Me(MeO)_2SiO_{1/2})_{0.01}(Me_2(OH)SiO_{1/2})_{0.01}$ with a number average molar mass Mn of 1710 g/mol and a weight average molar mass Mw of 4700 g/mol, $(MeSiO_{3/2})_{0.48}(ViSiO_{3/2})_{0.12}(IoSiO_{3/2})_{0.01}(Me(MeO)SiO_{2/2})_{0.26}(Vi(MeO)SiO_{2/2})_{0.07}(Me(HO)SiO_{2/2})_{0.02}(Io(HO)SiO_{2/2})_{0.01}(Me_2SiO_{2/2})_{0.01}(Me(MeO)_2SiO_{1/2})_{0.01}(Io(OH)_2SiO_{1/2})_{0.01}$ with a number average molar mass Mn of 1540 g/mol and a weight average molar mass Mw of 3630 g/mol, $(MeSiO_{3/2})_{0.25}(ViSiO_{3/2})_{0.10}(PhSiO_{3/2})_{0.15}(Me(MeO)SiO_{2/2})_{0.21}(Vi(MeO)SiO_{2/2})_{0.09}(Ph(MeO)SiO_{2/2})_{0.11}(Me(HO)SiO_{2/2})_{0.01}(Ph(HO)SiO_{2/2})_{0.02}(Me_2SiO_{2/2})_{0.01}(Me(MeO)_2SiO_{1/2})_{0.01}(Ph(OH)(MeO)SiO_{1/2})_{0.01}(Me_3SiO_{1/2})_{0.03}$ with a number average molar mass Mn of 1040 g/mol and a weight average molar mass Mw of 1590 g/mol, $(MeSiO_{3/2})_{0.46}(ViSiO_{3/2})_{0.11}(Me(EtO)SiO_{2/2})_{0.28}(Vi(EtO)SiO_{2/2})_{0.08}(Me(HO)SiO_{2/2})_{0.02}(Me_2SiO_{2/2})_{0.01}(Me(EtO)_2SiO_{1/2})_{0.01}(Me_3SiO_{1/2})_{0.03}$ with a number average molar mass Mn of 1610 g/mol and a weight average molar mass Mw of 3690 g/mol, $(MeSiO_{3/2})_{0.29}(ViSiO_{3/2})_{0.22}(Me(MeO)SiO_{2/2})_{0.08}(Vi(MeO)SiO_{2/2})_{0.06}(Me(HO)SiO_{2/2})_{0.01}(Me_2SiO_{2/2})_{0.24}(Me(MeO)_2SiO_{1/2})_{0.01}(Me(MeO)SiO_{2/2})_{0.05}(Me_3SiO_{1/2})_{0.04}$ with a number average molar mass Mn of 2200 g/mol and a weight average molar mass Mw of 6800 g/mol, wherein Me is the methyl radical, Vi the vinyl radical, Et the ethyl radical, Ph the phenyl radical, Ma the 3-methacryloxypropyl radical and Io the 2,4,4-trimethylpentyl radical.

The resins (A) used in accordance with the invention can be solid or liquid at 23° C. and 1000 hPa, wherein the resins (A) are preferably liquid at 23° C. and 1000 hPa.

If the resins (A) used in accordance with the invention are liquid, they preferably have a dynamic viscosity of at least 1000 mPa·s, more preferably 1500 mPa·s to 1,000,000 mPa·s, and especially 3000 mPa·s to 100,000 mPa·s, in each case at 23° C.

In the context of the present invention, the dynamic viscosity is determined in accordance with DIN 53019 at a temperature, unless stated otherwise, of 23° C. and an atmospheric pressure of 1013 hPa. The measurement is carried out using a "Physica MCR 300" rotary rheometer from Anton Paar. In this case, for viscosities of 1 to 200 mPa·s, a coaxial cylinder measuring system (CC 27) with a ring measurement gap of 1.13 mm is used, and for viscosities of greater than 200 mPa·s a cone-plate measuring system (Searle system with measuring cone CP 50-1) is used. The shear rate is adjusted to the polymer viscosity (1 to 99 mPa·s at 100 $s^{-1}$; 100 to 999 mPa·s at 200 $s^{-1}$; 1000 to 2999 mPa·s at 120 $s^{-1}$; 3000 to 4999 mPa·s at 80 $s^{-1}$; 5000 to 9999 mPa·s at 62 $s^{-1}$; 10,000 to 12,499 mPa·s at 50 $s^{-1}$; 12,500 to 15,999 mPa·s at 38.5 s$^{-1}$; 16,000 to 19,999 mPa·s at 33 s$^{-1}$; 20,000 to 24,999 mPa·s at 25 s$^{-1}$; 25,000 to 29,999 mPa·s at 20 s$^{-1}$; 30,000 to 39,999 mPa·s at 17 s$^{-1}$; 40,000 to 59,999 mPa·s at 10 s$^{-1}$; 60,000 to 149,999 mPa·s at 5 s$^{-1}$; 150,000 to 199,999 mPa·s at 3.3 s$^{-1}$; 200,000 to 299,999 mPa·s at 2.5 s$^{-1}$; 300,000 to 1,000,000 mPa·s at 1.5 s$^{-1}$.

After adjusting the temperature of the measurement system to the measurement temperature, a three-stage measurement program consisting of a run-in phase, a pre-shearing and a viscosity measurement is applied. The run-in phase takes place by step-wise increase of the shear rate within one minute to the above-stated shear rate which is dependent on the viscosity to be expected and in which the measurement is intended to be carried out. As soon as this is reached, the pre-shearing is carried out at constant shear rate for 30 s, then 25 individual measurements for 4.8 s each are carried out to determine the viscosity, from which the average value is determined. The average value corresponds to the dynamic viscosity which is given in mPa·s.

The resins (A) used in accordance with the invention preferably have a number average molar mass Mn of 1000 to 6000 g/mol, more preferably 1100 g/mol to 5000 g/mol, yet more preferably 1200 g/mol to 4000 g/mol, and especially 1400 g/mol to 3000 g/mol.

In the context of the present invention, the number average molar mass Mn and the weight average molar mass Mw, rounded to the nearest whole number 10 in accordance with DIN 1333:1992-02 paragraph 4, are determined by size exclusion chromatography (SEC/GPC) in accordance with DIN 55672-1/ISO 160414-1 and ISO 160414-3, in which a set of columns based on poly(styrene-codivinylbenzene) as stationary phase comprising three columns of different pore size distribution of the sequence of 10,000 Å, 500 Å and 100 Å with an exclusion size of greater than 450.000 g/mol is calibrated against polystyrene standard. Phenyl-containing components are determined using THF as eluent and non-phenyl-containing components using toluene as eluent. The analyses are carried out at a column temperature of 40±1° C. and using a refractive index detector.

The resins (A) used in accordance with the invention are commercial products or they can be produced by methods customary in chemistry.

The compounds (B) used in accordance with the invention are preferably those having 5 to 50 carbon atoms, more preferably 6 to 30 carbon atoms, and especially 6 to 20 carbon atoms.

The compounds (B) used in accordance with the invention are preferably organic compounds having at least one unit of the formula (II), which are free of silicon atoms.

The compounds (B) used in accordance with the invention are preferably liquid at temperatures below 60° C., more preferably below 40° C., and especially below 30° C., in each case at a pressure of 1000 hPa.

The compounds (B) used in accordance with the invention preferably have a boiling point of at least 120° C., more preferably at least 150° C., and especially at least 200° C., in each case at a pressure of 1000 hPa.

Examples of radicals R$^3$ are the radicals specified for R and R$^1$, and the cyano radical.

The radical R$^3$ is preferably a hydrogen atom or methyl radical.

Examples of radical R$^5$ are the radicals specified for R and R$^1$.

The radical R$^5$ is preferably a hydrogen atom or monovalent, aliphatically saturated hydrocarbon radicals, more preferably a hydrogen atom or the methyl radical.

The radical Z is preferably —O—.

The compounds (B) are preferably organic acrylates or methacrylates free of basic nitrogen, more preferably organic mono-, di- or triacrylates or organic mono-, di- or trimethacrylates free of basic nitrogen, especially organic mono- or diacrylates or organic mono- or dimethacrylates free of basic nitrogen.

Examples of compounds (B) used in accordance with the invention are tripropylene glycol diacrylate (CAS: 42978-66-5), (1-methylethylidene) bis(4,1-phenyleneoxy-3,1-propanediyl) bismethacrylate (CAS: 27689-12-9), tris(2-acryloyloxyethyl) isocyanurate (CAS: 40220-08-4), (5-ethyl-1,3-dioxan-5-yl)methyl acrylate (CAS: 66492-51-1), tricyclo[5.2.1.0$^{2,6}$]decanedimethanol diacrylate (CAS: 42594-17-2), (octahydro-4,7-methano-1H-indenediyl) bis(methylene) dimethacrylate (CAS: 43048-08-4), [2-(acryloyloxy) ethyl] trimethylammonium chloride (CAS: 44992-01-0), [2-(methacryloyloxy)ethyl]trimethylammonium chloride (CAS: 5039-78-1), 1,1,1-trimethylolethane trimethacrylate (CAS: 24690-33-3), 1,1,1-trimethylolethane triacrylate (CAS: 19778-85-9), 1,12-dodecanediol dimethacrylate (CAS: 72829-09-5), 1,2,5-pentanetriol trimethacrylate (CAS: 287196-31-0), 1,3-propanediol diacrylate (CAS: 24493-53-6), 1,3-butanediol diacrylate (CAS: 19485-03-1), 1,3-butanediol dimethacrylate (CAS: 1189-08-8), 1,4-butanediol diacrylate (CAS: 1070-70-8), 1,4-butanediol dimethacrylate (CAS: 2082-81-7), 1,6-hexanediol diacrylate (CAS: 13048-33-4), 1,6-hexanediol dimethacrylate (CAS: 6606-59-3), 1,9-nonanediol diacrylate (CAS: 107481-28-7), 1,9-nonanediol dimethacrylate (CAS: 65833-30-9), 1,10-decanediol diacrylate (CAS: 13048-34-5), 1,10-decanediol dimethacrylate (CAS: 6701-13-9), 1,4-cyclohexanediol dimethacrylate (CAS: 38479-34-4), 1,4-butanediylbis[oxy(2-hydroxy-3,1-propanediyl)] diacrylate (CAS: 52408-42-1), 2-(1-(2-hydroxy-3,5-di-tert-pentylphenyl) ethyl)-4,6-di-tert-pentylphenyl acrylate (CAS: 123968-25-2), 2-(2-oxo-1-imidazolidinyl)ethyl methacrylate (CAS: 86261-90-7), 2-(2-vinyloxyethoxy)ethyl acrylate (CAS RN: 86273-46-3), 2-(methacryloyloxy) ethyl acetoacetate (CAS: 21282-97-3), 2,2-dimethylpropanediol dimethacrylate (CAS: 1985-51-9), 2,3-dihydroxypropyl methacrylate, 2,3-epoxypropyl methacrylate, 2-[[2,2-bis[[(1-oxoallyl)oxy]methyl]butoxy]methyl]-2-ethyl-1,3-propanediyl diacrylate (CAS: 94108-97-1), 2-[2-(2-ethoxyethoxy) ethoxy]ethyl methacrylate (CAS: 39670-09-2), 2-(2-ethoxyethoxy) ethyl acrylate, hydroxyethylcaprolactone acrylate (CAS: 110489-05-9), tricyclo[5.2.1.0$^{2,6}$]decanedimethanol diacrylate (CAS: 42594-17-2), bisphenol A ethoxylate dimethacrylate (CAS: 41637-38-1), bisphenol A epoxy diacrylate (CAS: 55818-57-0), 2-allyloxyethoxyethyl methacrylate (CAS: 58985-94-7), 2-ethoxyethyl methacrylate (CAS: 2370-63-0), octocrylene (CAS: 6197-30-4), 2-ethylhexyl acrylate (CAS: 103-11-7), 2-ethylhexyl methacrylate (CAS: 688-84-6), 2-ethylhexyl trans-4-methoxycinnamate (CAS: 83834-59-7), 2-hydroxyethyl acrylate, 2-hydroxyethyl methacrylate, 2-methoxyethyl acrylate (CAS: 3121-61-7), 2-methoxyethyl methacrylate, 2-n-butoxyethyl methacrylate, 2-octyl cyanoacrylate, 2-phenoxyethyl acrylate (CAS: 48145-04-6), 2-phenoxyethyl methacrylate, 2-propylheptyl acrylate (CAS: 149021-58-9), 2-propylheptyl methacrylate, 3-(acryloyloxy)-2-hydroxypropyl methacrylate (CAS: 1709-71-3), 3,4-epoxycyclohexylmethyl methacrylate, 3-hydroxy-2,2-dimethylpropyl 3-hydroxy-2,2-dimethyl propionate (CAS: 1115-20-4), 4-hydroxybutyl acrylate (CAS: 2478-10-6), 2-acetoacetoxyethyl methacrylate (CAS: 21282-97-3), allyl methacrylate, benzyldimethyl[2-[(1-oxoallyl)oxy]ethyl]ammonium chloride, benzyl methacrylate, bisphenol A dimethacrylate, butyldiglycol methacrylate, cyclohexyl methacrylate (CAS: 101-43-9), cyclohexyl acrylate (CAS: 3066-71-5), dicyclopentanyl acrylate (CAS: 7398-56-3), dicyclopentanyl methacrylate (CAS: 34759-34-7), cyclopentyl methacrylate, dicyclopentenyloxyethyl methacrylate (CAS: 68586-19-6), diethylene glycol dimethacrylate (CAS: 2358-84-1), diurethane dimethacrylate, mixture of isomers (CAS: 72869-86-4), ethyl 2-cyano-3-ethoxyacrylate (CAS: 94-05-3), ethyl 2-cyanoacrylate (CAS: 7085-85-0), ethyl 3-benzoylacrylate, ethyl diglycol methacrylate, ethylene glycol dimethacrylate (CAS: 97-90-5), ethyl acrylate, ethyl methacrylate, ethyl triethylene glycol methacrylate, furfuryl methacrylate, glycerol dimethacrylate, hexadecyl acrylate, hexadecyl methacrylate (CAS: 2495-27-4), hexahydro-4,7-methano-1H-indenyl acrylate (CAS 12542-30-2), hydroxybutyl methacrylate (CAS:29008-35-3), hydroxypropyl acrylate (CAS: 25584-83-2), hydroxypropyl methacrylate, isomeric mixture (CAS: 27813-02-1), 2-hydroxypropyl methacrylate (CAS: 923-26-2), 3-hydroxypropyl methacrylate (CAS: 2761-09-3), isobornyl acrylate (CAS: 5888-33-5), isobornyl methacrylate (CAS: 7534-94-3), isodecyl acrylate, isodecyl methacrylate, isooctyl acrylate (CAS: 29590-42-9), isooctyl methacrylate (CAS: 29590-42-9), isopentyl methacrylate, isotridecyl methacrylate, 3-methylbut-2-yl methacrylate, methacrylic anhydride (CAS: 760-93-0), methyl cinnamate (CAS: 103-26-4), methyl methacrylate, neopentyl glycol propoxylated diacrylate (CAS: 84170-74-1), neopentyl glycol dimethacrylate (CAS: 1985-51-9), n-butyl acrylate, n-butyl methacrylate (CAS: 97-88-1), n-decyl acrylate, n-decyl methacrylate, n-dodecyl acrylate, n-dodecyl methacrylate (CAS: 142-90-5), n-hexyl acrylate, n-hexyl methacrylate, n-octadecyl acrylate, n-octadecyl methacrylate, 2-norbornyl acrylate (CAS: 10027-06-2), dipropylene glycol diacrylate (CAS: 57472-68-1), 2-ethylhexyl 2-cyano-3,3-diphenylacrylate (CAS: 6197-30-4), phenyl methacrylate polyether polytetraacrylate (CAS: 51728-26-8), polyethylene glycol dimethacrylate, poly(propylene glycol) diacrylate (CAS: 52496-08-9), poly(propylene glycol) dimethacrylate (CAS: 25852-49-7), p-vinylbenzyl methacrylate, sec-butyl acrylate, sec-butyl methacrylate, epoxidized soybean oil acrylate (CAS: 91722-14-4), tert-butyl acrylate, tert-butyl methacrylate, tetradecyl acrylate, tetradecyl methacrylate, tetrahydrofurfuryl methacrylate, tridecyl acrylate, tridecyl methacrylate, triethylene glycol dimethacrylate (CAS: 109-16-0), trimethylolpropane ethoxylate triacrylate (CAS: 28961-43-5), trimethylolpropane triacrylate (CAS: 15625-89-5), trimethylolpropane trimethacrylate (CAS: 3290-92-4), trityl methacrylate, vinyl 4-methacryloxybutyl ether, N-tert-butylacrylamide, N-(hydroxymethyl)methacrylamide, N,N-dimethylacrylamide (CAS: 2680-03-7), N-(1,1,3,3-tetramethylbutyl)acrylamide (CAS: 4223-03-4), N-(1,1-dimethyl-3-oxobutyl)acrylamide (CAS: 2873-97-4), N-(hydroxymethyl)acrylamide (CAS: 924-42-5), N-isopropylmethacrylamide (CAS: 13749-61-6), N,N-diethylacrylamide (CAS: 2675-94-7), N,N-diethylmethacrylamide (CAS: 5441-99-6), N-methylolmethacrylamide, N-tert-butylmethacrylamide, N-tert-butylacrylamide, N-2-hydroxyethylacrylamide (CAS: 7646-67-5), N-2-hydroxyethylmethacrylamide, N,N'-hexamethylenebis(methacrylamide) (CAS: 16069-15-1) and N-dodecylacrylamide.

The compounds (B) used in accordance with the invention are more triethylene glycol dimethacrylate (CAS: 109-16-0), trimethylolpropane triacrylate (CAS: 15625-89-5), n-butyl methacrylate (CAS: 97-88-1), n-dodecyl methacrylate (CAS: 142-90-5), 2-ethylhexyl acrylate (CAS: 103-11-7), 2-ethylhexyl methacrylate (CAS: 688-84-6), 2-hydroxyethyl acrylate (CAS: 818-61-1), 2-hydroxyethyl methacrylate (CAS: 868-77-9), hydroxypropyl acrylate (CAS: 25584-83-2), hydroxypropyl methacrylate, isomeric mixture (CAS: 27813-02-1), 2-hydroxypropyl methacrylate (CAS: 923-26-2), 3-hydroxypropyl methacrylate (CAS: 2761-09-3), 2-methoxyethyl acrylate (CAS: 3121-61-7), ethylene glycol dimethacrylate (CAS: 97-90-5), isobornyl acrylate (CAS: 5888-33-5), isobornyl methacrylate (CAS: 7534-94-3), glycerol propoxy triacrylate (CAS: 52408-84-1), 1,4-butanediol dimethacrylate (CAS: 2082-81-7), 1,6-hexanediol dimethacrylate (CAS: 6606-59-3), 1,9-nonanediol diacrylate (CAS: 107481-28-7), dipropylene glycol diacrylate (CAS: 57472-68-1), poly(propylene glycol) diacrylate (CAS: 52496-08-9), poly(propylene glycol) dimethacrylate (CAS: 25852-49-7), tricyclo[5.2.1.0$^{2,6}$]decanedimethanol diacrylate (CAS: 42594-17-2), dicyclopentanyl acrylate (CAS: 7398-56-3), dicyclopentanyl methacrylate (CAS: 34759-34-7), cyclohexyl methacrylate (CAS: 101-43-9) or cyclohexyl acrylate (CAS: 3066-71-5).

The compounds (B) used in accordance with the invention are particularly preferably n-butyl methacrylate (CAS: 97-88-1), 2-ethylhexyl acrylate (CAS: 103-11-7), 2-ethylhexyl methacrylate (CAS: 688-84-6), 2-hydroxyethyl methacrylate (CAS: 868-77-9), hydroxypropyl methacrylate, isomeric mixture (CAS: 27813-02-1), 2-hydroxypropyl methacrylate (CAS: 923-26-2), 3-hydroxypropyl methacrylate (CAS: 2761-09-3), 4-hydroxybutyl acrylate (CAS: 2478-10-6), isobornyl acrylate (CAS: 5888-33-5), isobornyl methacrylate (CAS: 7534-94-3), 1,4-butanediol dimethacrylate (CAS: 2082-81-7), 1,6-hexanediol dimethacrylate (CAS: 6606-59-3), 1,9-nonanediol diacrylate (CAS: 107481-28-7), tricyclo[5.2.1.0$^{2,6}$]decanedimethanol diacrylate (CAS: 42594-17-2), cyclohexyl methacrylate (CAS: 101-43-9), cyclohexyl acrylate (CAS: 3066-71-5), dicyclopentanyl acrylate (CAS: 7398-56-3) or dicyclopentanyl methacrylate (CAS: 34759-34-7).

The compounds (B) used in accordance with the invention are especially n-butyl methacrylate (CAS: 97-88-1), 2-hydroxyethyl methacrylate (CAS: 868-77-9), hydroxypropyl methacrylate, isomeric mixture (CAS: 27813-02-1), 2-hydroxypropyl methacrylate (CAS: 923-26-2), 3-hydroxypropyl methacrylate (CAS: 2761-09-3), isobornyl acrylate (CAS: 5888-33-5), isobornyl methacrylate (CAS: 7534-94-3), cyclohexyl methacrylate (CAS: 101-43-9), cyclohexyl acrylate (CAS: 3066-71-5), tricyclo[5.2.1.0$^{2,6}$]decanedimethanol diacrylate (CAS: 42594-17-2), dicyclopentanyl acrylate (CAS: 7398-56-3) or dicyclopentanyl methacrylate (CAS: 34759-34-7).

The compositions according to the invention preferably comprise component (B) in amounts of 1 to 250 parts by weight, more preferably 10 to 100 parts by weight, and especially 15 to 50 parts by weight, based in each case on 100 parts by weight of component (A).

The compositions according to the invention preferably comprise at least two different components (B), more preferably at least two different acrylates or methacrylates (B), wherein one component (B) in particular is a compound selected from 2-hydroxyethyl acrylate, 2-hydroxyethyl methacrylate, hydroxypropyl methacrylate (isomeric mixture, CAS: 27813-02-1), 2-hydroxypropyl methacrylate (CAS: 923-26-2) and 3-hydroxypropyl methacrylate (CAS: 2761-09-3).

The compositions according to the invention most preferably comprise at least one component (B) selected from 2-hydroxyethyl methacrylate, hydroxypropyl methacrylate (isomeric mixture, CAS: 27813-02-1), 2-hydroxypropyl methacrylate (CAS: 923-26-2) and 3-hydroxypropyl methacrylate (CAS: 2761-09-3) and at least one other component (B) selected from 1,6-hexanediol dimethacrylate (CAS: 6606-59-3), 1,9-nonanediol diacrylate (CAS: 107481-28-7), poly(propylene glycol) diacrylate (CAS: 52496-08-9), poly (propylene glycol) dimethacrylate (CAS: 25852-49-7), wherein these compositions are advantageously low in odor.

In a further especially preferred variant, the compositions according to the invention comprise at least one component (B) selected from 2-hydroxyethyl methacrylate, hydroxypropyl methacrylate (isomeric mixture, CAS: 27813-02-1), 2-hydroxypropyl methacrylate (CAS: 923-26-2) and 3-hydroxypropyl methacrylate (CAS: 2761-09-3) and at least one other component (B) selected from butyl methacrylate, 2-ethylhexyl acrylate (CAS: 103-11-7) and 2-ethylhexyl methacrylate (CAS: 688-84-6).

In a further especially preferred variant, the compositions according to the invention comprise at least one component (B) selected from 2-hydroxyethyl methacrylate, hydroxypropyl methacrylate (isomeric mixture, CAS: 27813-02-1), 2-hydroxypropyl methacrylate (CAS: 923-26-2) and 3-hydroxypropyl methacrylate (CAS: 2761-09-3) and at least one other component (B) selected from tricyclo[$5.2.1.0^{2,6}$]decanedimethanol diacrylate (CAS: 42594-17-2), dicyclopentanyl acrylate (CAS: 7398-56-3), dicyclopentanyl methacrylate (CAS: 34759-34-7), cyclohexyl acrylate, cyclohexyl methacrylate, isobornyl acrylate and isobornyl methacrylate.

In a particularly preferred variant, the compositions according to the invention comprise as component (B) hydroxypropyl methacrylate (isomeric mixture, CAS: 27813-02-1) and one other component (B) selected from isobornyl acrylate, isobornyl methacrylate, cyclohexyl acrylate and cyclohexyl methacrylate.

The compositions according to the invention can be crosslinked by current known methods for polymerization, for example thermally or by UV irradiation, wherein thermal activation is preferred.

The initiators (C) can be all radical starters known to date, for example inorganic or organic peroxides, azo compounds, C—C initiators or free radical-forming curing systems in combination with a metal salt, as described in DE-A 10 2013 114 061 and EP-B 2 985 318.

Examples of initiators (C) used are free radical initiators such as organic peroxides such as methyl ethyl ketone peroxide, cyclohexanone peroxide, acetylacetone peroxide, methyl isobutyl ketone peroxide, dilauroyl peroxide, dibenzoyl peroxide, di(2,4-dichlorobenzoyl) peroxide, di(4-methylbenzoyl) peroxide, di(tert-butylperoxyisopropyl)benzene, dicumyl peroxide, 2,5-dimethyl-2,5-di (tert-butylperoxy) hexane, 2,5-dimethyl-2,5-di (tert-butylperoxy)hex-3-yne, di-tert-butyl peroxide, tert-butyl cumyl peroxide, tert-butyl monoperoxymaleate, tert-amyl peroxy-2-ethylhexanoate, tert-amyl peroxyneodecanoate, tert-butyl peroxyisobutyrate, tert-butyl peroxy-3,5,5-trimethylhexanoate, tert-butyl peroxybenzoate, tert-butyl peroxybenzoate, butyl 4,4-di(tert-butylperoxy)valerate, 1,1-di (tert-butylperoxy)-3,3,5-trimethylcyclohexane, cumyl hydroperoxide, tert-butyl hydroperoxide, di(4-tert-butylcyclohexyl) peroxydicarbonate, di(n-propyl) peroxydicarbonate and tert-butylperoxy 2-ethylhexyl carbonate; azo initiators such as azobis(isobutyronitrile), 1,1'-azobis(cyclohexanecarbonitrile) and 1,1-azobis(hexahydrobenzonitrile); and C—C initiators such as 1,1,2,2-tetraphenyl-1,2-ethanediol.

Preferred initiators (C) are organic peroxides, particularly preferably tert-butyl peroxybenzoate or tert-butyl peroxy-3, 5, 5-trimethylhexanoate.

The initiators (C) used in accordance with the invention can be dissolved or dispersed in organosilicon compounds (G) or solvents (L) optionally used.

The initiators (C) used in accordance with the invention may be either solid or liquid at 23° C. and 1000 hPa, wherein preference is given to initiators (C) liquid at 23° C. and 1000 hPa.

If initiators (C) are dissolved or dispersed in organosilicon compounds (G) or solvents (L) optionally used, then the components (G) or (L) preferably have a boiling point of at least 100° C., particularly preferably of at least 150° C., especially at least 200° C., in each case at a pressure of 1000 hPa.

Preference is given to using initiators (C) that can be activated thermally which have a 1 h half-life temperature in the range of 60° C. to 200° C., particularly preferably in the range of 80° C. to 160° C., especially in the range of 90° C. to 130° C.

The compositions according to the invention preferably comprise initiators (C) in amounts of 0.1 to 5 parts by weight, more preferably 0.2 to 3 parts by weight, and especially 0.3 to 2 parts by weight, based in each case on 100 parts by weight of the total weight of components (A) and (B).

The fillers (D) used in the compositions according to the invention may be any fillers known to date.

The fillers (D) used in accordance with the invention are preferably those which dissolve less than 1% by weight in toluene at 23° C. and 1000 hPa.

Examples of fillers (D) are non-reinforcing fillers, i.e. fillers having a BET surface area of preferably up to 50 m$^2$/g, such as quartz, quartz powder, quartz granules, fused quartz powder, quartz glass powder, glass powder, crushed glass, mirror fragments, cristobalite, cristobalite powder, cristobalite granules, diatomaceous earth; silicates insoluble in water such as calcium silicate, magnesium silicate, zirconium silicate, talc, kaolin, zeolites; metal oxide powders such as aluminum, titanium, iron or zinc oxides or mixed oxides thereof; barium sulfate, calcium carbonate, marble flour, gypsum, silicon nitride, silicon carbide, boron nitride, plastics powders such as polyacrylonitrile powders; reinforcing fillers, i.e. fillers having a BET surface area of more than 50 m$^2$/g, such as pyrogenically produced silica, precipitated silica, precipitated chalk, carbon black such as furnace black and acetylene black and silicon-aluminum mixed oxides of high BET surface area; aluminum trihydroxide, magnesium hydroxide, hollow-sphere fillers such as ceramic microspheres, such as those obtainable for example under the trade name Zeeospheres™ from 3M Deutschland GmbH, Neuss, Germany; fibrous fillers such as wollastonite, montmorillonite, bentonite and also chopped and/or ground glass fibers (short glass fibers) or mineral wool; fibrous wovens consisting of glass, carbon or plastic. The fillers mentioned can be rendered hydrophobic, for example by treatment with organosilanes or organosiloxanes or with stearic acid.

The fillers (D) used in accordance with the invention may be used either each individually or else in any desired mixture with one another.

Component (D) preferably comprises a component selected from particulate fillers, including fibers up to a length of 5 cm (D1) and semi-finished fiber product comprising fibers having a length of more than 5 cm (D2).

The fillers (D1) used in accordance with the invention preferably have an SiO$_2$ content of more than 85% by weight, more preferably more than 95% by weight, and especially more than 97% by weight.

The fillers (D1) used in accordance with the invention preferably comprise inorganic fillers, more preferably inorganic, silicon-containing fillers, most preferably those from natural sources, such as quartz, quartz powders, quartz granules, fused quartz powders, cristobalite, cristobalite powders, cristobalite granules, and fibrous, silicon-containing fillers from natural sources such as montmorillonite and wollastonite, or synthetic, silicon-containing products such as pyrogenic silica, which may be obtained by flame hydrolysis of, for example, tetrachlorosilane in an oxyhydrogen gas flame (fumed silica), or inorganic, fibrous, synthetic, silicon-containing fillers such as chopped or ground short glass fibers.

Filler (D1) more preferably comprises quartz powders, quartz granules, cristobalite powders, cristobalite granules, montmorillonite or wollastonite.

Most preferably filler (D1) comprises quartz powders, quartz granules, cristobalite powders or cristobalite granules.

The fillers (D2) used are preferably wovens, laid scrims, knits, braids, mats or nonwovens, where the fibers may consist of any fiber-forming materials known to date, such as inorganic fibers of basalt, boron, glass, ceramic or quartz; metallic steel fibers; organic fibers composed of aramid, carbon, PPBO, polyester, polyamide, polyethylene or polypropylene; and also natural fibers of flax, hemp, wood or sisal.

The fillers (D1) and (D2) used in accordance with the invention may optionally have been surface treated. Preferably the fillers (D1) used in accordance with the invention are not surface treated. Preferably the fillers (D2) used in accordance with the invention are surface treated.

In a preferred embodiment, the compositions according to the invention are compositions whose fillers (D) comprise particulate fillers (D1) (composition 1).

In a preferred embodiment, the compositions 1 according to the invention comprise, as component (D1), mixtures comprising fine-grained and coarse-grained fillers.

If the compositions 1 according to the invention comprise as filler (D1) mixtures of fine and coarse fillers, the fillers are preferably selected from quartz and cristobalite, more preferably quartz and cristobalite from natural sources, especially mixtures of fine and coarse quartz.

The fine-grained fillers (D1) used according to the invention preferably have particles sizes of 0.02 µm to less than 200 µm, more preferably 0.1 µm to less than 200 µm, and most preferably 0.3 µm to 100 µm. Preferably at most 90% by weight of the fine-grained fillers (D1) used according to the invention have particle sizes of 0.02 µm to less than 100 µm, more preferably at most 90% by weight of the fine-grained fillers (D1) used according to the invention have particle sizes of 0.02 µm to less than 70 µm. In the case of fibrous fillers, this corresponds to the longest extent of the fiber.

The coarse-grained fillers (D1) used according to the invention preferably have particle sizes of at least 0.2 mm, more preferably from 0.2 mm to 10 mm, yet more preferably from 0.2 mm to 5 mm, and especially 0.2 mm to 3 mm.

In a further preferred embodiment, component (D1) consists to an extent of at least 80% by weight, more preferably to an extent of at least 90% by weight, of a mixture of fine-grained fillers having particle sizes of 0.1 µm to less than 200 µm and coarse-grained fillers having particle sizes of 0.2 mm to 10 mm.

Used particularly as coarse-grained filler (D1) is quartz or cristobalite from natural sources.

If mixtures of fine-grained and coarse-grained fillers used as component (D1), then the weight ratio of fine-grained to coarse-grained fillers is preferably from 5:1 to 1:5, more preferably 4:1 to 1:4, and most preferably 3:1 to 1:3.

Changes in the ratio of fine-grained to coarse-grained fillers may also at the same time change the flexural strength; for example, with increasing ratio of fine-grained to coarse-grained fillers, the flexural strength may increase, in which case it may be necessary to increase the proportion of components (A) and (B) as a proportion of the total mixture, owing to the larger overall surface area of the filler particles.

The particle size distribution of particles >500 µm is analyzed preferably using an ALPINE e200 LS air jet sieve, with analytical sieves meeting the requirements of DIN ISO 3310-1. The particle size distribution in the range from about 0.02 µm to 500 µm is analyzed preferably using a CILAS 1064 PARTICLE SIZE ANALYZER from Cilas.

In another preferred embodiment, the compositions 1 according to the invention comprise as component (D1) exclusively fine-grained fillers.

The compositions 1 according to the invention comprise fillers preferably (D1) in amounts of in total 70 to 99 parts by weight, more preferably from 80 to 95 parts by weight, and especially from 87 to 92 parts by weight, based in each case on 100 parts by weight of the composition according to the invention.

Filler (D) in the compositions 1 according to the invention consists preferably predominantly, more preferably completely, of filler (D1).

In another preferred embodiment, the compositions according to the invention are compositions which as fillers (D) comprise semi-finished fiber products (D2) (composition 2).

The compositions 2 according to the invention preferably comprise as filler (D2) fibrous wovens, fibrous laid scrims, fibrous knits or fibrous braids, particularly preferably each consisting of carbon fibers, glass fibers or aramid.

The fibrous wovens (D2) or fibrous laid scrims (D2) used according to the invention are preferably used in each case in a plurality of plies.

The compositions 2 according to the invention preferably comprise fillers (D2) in amounts of, in total, 40 to 90 parts by weight, more preferably from 50 to 80 parts by weight, based in each case on 100 parts by weight of the composition according to the invention.

Filler (D) in the compositions 2 according to the invention consists preferably predominantly, more preferably completely, of component (D2).

In a preferred embodiment, component (D2) consists to an extent of at least 80% by weight, more preferably to an extent of at least 90% by weight, of fibrous wovens, fibrous laid scrims, fibrous knits or fibrous braids.

The amines (K) used in accordance with the invention are preferably organic compounds (K1) which do not comprise any silicon atoms, or are organosilicon compounds (K2).

The amines (K1) used in accordance with the invention are preferably those of the formula

where $R^7$ may be the same or different and are a hydrogen atom or are monovalent or divalent hydrocarbon radicals optionally substituted by hydroxyl groups, halogen atoms, amino groups, ether groups, ester groups, epoxy groups, mercapto groups, cyano groups or (poly)glycol radicals, which may be interrupted by heteroatoms, with the proviso that in formula (III) at most two radicals $R^7$ have the definition of hydrogen atom, or are aliphatic cyclic amines, such as piperidine and morpholine for example.

Examples of radicals $R^7$ are the examples specified for R and $R^1$ and radicals of the formula (II).

The radicals $R^7$ are preferably a hydrogen atom or hydrocarbon radicals having 1 to 20 carbon atoms, optionally substituted by hydroxyl, allyl, acrylic or methacrylic groups, optionally interrupted by heteroatoms, more preferably a hydrogen atom or the methyl, ethyl, propyl, butyl, octyl, undecyl, hexadecyl, acryloxyethyl, methacryloxyethyl, acrylamidopropyl or the methacrylamidopropyl radical.

Examples of compounds (K1) used in accordance with the invention are butylamine, pentylamine, hexylamine, cyclohexylamine, heptylamine, octylamine, 1,1,3,3-tetramethylbutylamine, 2-ethylhexylamine, nonylamine, 2-methyl-2-heptylamine, decylamine, undecylamine, dodecylamine, tridecylamine, tetradecylamine, pentadecylamine, hexadecylamine, octadecylamine, diethyl-n-propylamine, cyclohexylmethylamine, dibutylamine, dioctylamine, bis(2-ethylhexyl)amine, piperidine, piperazine, pyrrolidine, triethylamine, tributylamine, 1,4-diazabicyclo[2.2.2]octane, trioctylamine, tris(2-ethylhexyl)amine, triethanolamine, 2-aminoethanol, 2-amino-n-propanol, 2-amino-2-methyl-1-propanol, 2-dimethylamino-2-methyl-1-propanol, N,N-diethylethanolamine, ethylenediamine, coconut fatty amine, coconut fatty methylamine, N,N-dimethylethanolamine, 2-(diethylamino)ethyl methacrylate (CAS: 105-16-8), 2-(dimethylamino)ethyl acrylate (CAS: 2439-35-2), 2-(dimethylamino)ethyl methacrylate (CAS: 2867-47-2), 2-[2,2-bis(2-prop-2-enoyloxyethoxymethyl)butoxy]ethyl 3-(dibutylamino)propanoate (CAS: 195008-76-5), 2-N-morpholinoethyl methacrylate, 2,2,6,6-tetramethyl-4-piperidyl acrylate, 2,2,6,6-tetramethyl-4-piperidyl methacrylate, 2-N-morpholinoethyl methacrylate, 2-tert-butylaminoethyl methacrylate, 3-(dimethylamino)propyl methacrylate, ethyl 3-(dimethylamino)acrylate (CAS: 924-99-2), piperidinethyl methacrylate, tert-butylaminoethyl methacrylate, N-[3-(dimethylamino)propyl]methacrylamide (CAS: 5205-93-6) and N-[3-(dimethylamino)propyl]acrylamide (CAS: 3845-76-9), 1,8-diazabicyclo-[5.4.0]-undec-7-ene (DBU), 1,5,7-triazabicyclo[4.4.0]dec-5-ene (TBD), 1,5-diazabicyclo [4.3.0]non-5-ene (DBN), N,N,N',N'-tetramethylguanidine (TMG), N,N-dimethylaniline, N,N-diethylaniline and N,N-dimethyl-p-toluidine.

The compounds (K1) used in accordance with the invention are preferably octylamine, dioctylamine, trioctylamine, 2-ethylhexylamine, bis(2-ethylhexyl)amine, tris(2-ethylhexyl)amine, undecylamine, hexadecylamine, 2-(dimethylamino)ethyl acrylate (CAS: 2439-35-2), 2-(dimethylamino) ethyl methacrylate (CAS: 2867-47-2), 2-(diethylamino) ethyl methacrylate (CAS: 105-16-8), N-[3-(dimethylamino)propyl]methacrylamide (CAS: 5205-93-6) or N-[3-(dimethylamino)propyl]acrylamide (CAS: 3845-76-9).

The compounds (K1) used in accordance with the invention are more preferably undecylamine, hexadecylamine, 2-(dimethylamino)ethyl acrylate (CAS: 2439-35-2), 2-(dimethylamino)ethyl methacrylate (CAS: 2867-47-2), N-[3-(dimethylamino)propyl]methacrylamide (CAS: 5205-93-6) or N-[3-(dimethylamino)propyl]acrylamide (CAS: 3845-76-9).

The amines (K2) used in accordance with the invention are preferably those composed of units of the formula

$$R^8_k R^{10}_l Si(OR^9)_m O_{(4-k-l-m)/2} \quad (IV),$$

in which $R^8$ may be the same or different and is a monovalent, SiC-bonded organic radical free of basic nitrogen, $R^9$ may be the same or different and has a definition specified for radical $R^2$, $R^{10}$ may be the same or different and is a monovalent, SiC-bonded radical having basic nitrogen, k is 0, 1, 2, or 3, l is 0, 1, 2, 3 or 4 and m is 0, 1, 2 or 3, with the proviso that the sum of k+l+m is less than or equal to 4 and at least one radical $R^{10}$ is present per molecule.

Examples of radicals $R^8$ are the examples specified for R and $R^1$ and radicals of the formula (II).

Radical $R^8$ are preferably hydrocarbon radicals having 1 to 18 carbon atoms, wherein particular preference is given to the methyl, ethyl or n-propyl radicals, especially the methyl radical.

Examples of radical $R^9$ are the examples specified for radical $R^2$.

The radical $R^9$ is preferably a hydrogen atom, the methyl or the ethyl radical.

Example of radicals $R^{10}$ are radicals of the formulae $H_2NCH_2-$, $H_2N(CH_2)_2-$, $H_2N(CH_2)_3-$, $H_2N(CH_2)_2NH(CH_2)_2-$, $H_2N(CH_2)_2NH(CH_2)_3-$, $H_2N(CH_2)_2NH(CH_2)_2NH(CH_2)_3-$, $H_3CNH(CH_2)_3-$, $C_2H_5NH(CH_2)_3-$, $H_3CNH(CH_2)_2-$, $C_2H_5NH(CH_2)_2-$, $H_2N(CH_2)_4-$, $H_2N(CH_2)_5-$, $H(NHCH_2CH_2)_3-$, $C_4H_9NH(CH_2)_2NH(CH_2)_2-$, cyclo-$C_6H_{11}NH(CH_2)_3-$, cyclo-$C_6H_{11}NH(CH_2)_2-$, $(CH_3)_2N(CH_2)_3-$, $(CH_3)_2N(CH_2)_2-$, $(C_2H_5)_2N(CH_2)_3-$ and $(C_2H_5)_2N(CH_2)_2-$.

$R^{10}$ is preferably an $H_2N(CH_2)_3-$, $H_2N(CH_2)_2NH(CH_2)_3-$, $H_3CNH(CH_2)_3-$, $C_2H_5NH(CH_2)_3-$ or cyclo-$C_6H_{11}NH(CH_2)_3-$ radical, greater preference being given to the $H_2N(CH_2)_2NH(CH_2)_3-$ or the $NH_2(CH_2)_3-$ radical.

The organosilicon compounds (K2) used in accordance with the invention can be either silanes, i.e. compounds of the formula (IV) where k+l+m=4, or siloxanes, i.e. compounds of units of the formula (IV) where k+l+m≤3.

If the organosilicon compounds (K2) are silanes, k is preferably 0, 1 or 2, more preferably 0 or 1, l is preferably 1 or 2, more preferably 1, and m is preferably 1, 2 or 3, more preferably 2 or 3, with the proviso that the sum of k+l+m is equal to 4.

Examples of silanes (K2) of the formula (IV) used in accordance with the invention are $H_2N(CH_2)_3-Si(OCH_3)_3$, $H_2N(CH_2)_3-Si(OC_2H_5)_3$, $H_2N(CH_2)_3-Si(OCH_3)_2CH_3$, $H_2N(CH_2)_3-Si(OC_2H_5)_2CH_3$, $H_2N(CH_2)_2NH(CH_2)_3-Si(OCH_3)_3$, $H_2N(CH_2)_2NH(CH_2)_3-Si(OC_2H_5)_3$, $H_2N(CH_2)_2NH(CH_2)_3-Si(OCH_3)_2CH_3$, $H_2N(CH_2)_2NH(CH_2)_3-Si(OC_2H_5)_2CH_3$, $H_2N(CH_2)_2NH(CH_2)_3-Si(OH)_3$, $H_2N(CH_2)_2NH(CH_2)_3-Si(OH)_2CH_3$, $H_2N(CH_2)_2NH(CH_2)_2NH(CH_2)_3-Si(OCH_3)_3$, $H_2N(CH_2)_2NH(CH_2)_2NH(CH_2)_3-Si(OC_2H_5)_3$, $C_6H_5NH(CH_2)_3-Si(OC_2H_5)_3$, $C_6H_5NH(CH_2)_3-Si(OCH_3)_3$, morpholino-$CH_2-Si(OC_2H_5)_3$, morpholino-$CH_2-Si(OCH_3)_3$, $(C_4H_9)_2N-CH_2-Si(OC_2H_5)_3$, $(C_4H_9)_2N-CH_2-Si(OCH_3)_3$, cyclo-$C_6H_{11}NH(CH_2)_3-Si(OCH_3)_3$, cyclo-$C_6H_{11}NH(CH_2)_3-Si(OC_2H_5)_3$, cyclo-$C_6H_{11}NH(CH_2)_3-Si(OCH_3)_2CH_3$, cyclo-$C_6H_{11}NH(CH_2)_3-Si(OC_2H_5)_2CH_3$, cyclo-$C_6H_{11}NH(CH_2)_3-Si(OH)_3$, cyclo-$C_6H_{11}NH(CH_2)_3-Si(OH)_2CH_3$, $HN((CH_2)_3-Si(OCH_3)_3)_2$ and $HN((CH_2)_3-Si(OC_2H_5)_3)_2$, wherein preference is given to $H_2N(CH_2)_2NH(CH_2)_3-Si(OCH_3)_3$, $H_2N(CH_2)_2NH(CH_2)_3-Si(OC_2H_5)_3$, $H_2N(CH_2)_2NH(CH_2)_3-Si(OCH_3)_2CH_3$, $H_2N(CH_2)_2NH(CH_2)_3-Si(OC_2H_5)_2CH_3$, $H_2N(CH_2)_3-Si(OCH_3)_3$, $H_2N(CH_2)_3-Si(OC_2H_5)_3$, $H_2N(CH_2)_3-Si(OCH_3)_2CH_3$ or $H_2N(CH_2)_3-Si(OC_2H_5)_2CH_3$, and particular preference is given to $H_2N(CH_2)_2NH(CH_2)_3-Si(OCH_3)_3$, $H_2N(CH_2)_2NH(CH_2)_3-Si$ $(OCH_3)_2CH_3$, $H_2N(CH_2)_2NH(CH_2)_3—Si(OC_2H_5)_3$ or $H_2N(CH_2)_2NH(CH_2)_3—Si(OC_2H_5)_2CH_3$.

If the organosilicon compound (K2) is an organopolysiloxane, the average value of k is preferably between 0.5 and 2.5, more preferably between 1.4 and 2.0, the average value of 1 is preferably between 0.01 and 1.0, more preferably between 0.01 and 0.6, and the average value of m is preferably between 0 and 2.0, more preferably between 0 and 0.2, with the proviso that the sum of k, l and m is less than or equal to 3.

The organopolysiloxanes (K2) composed of units of the formula (IV) that can be used in accordance with the invention preferably have a viscosity at 25° C. of 5 to $10^3$ mPas, more preferably of 10 to $10^4$ mPas.

Examples of organopolysiloxanes (K2) composed of units of the formula (IV) that can be used in accordance with the invention are $H_2N(CH_2)_3—Si(OCH_3)_2—O—Si(CH_3)(OCH_3)_2$,
$H_2N(CH_2)_3—Si(OC_2H_5)_2—O—Si(CH_3)(OCH_3)_2$,
$H_2N(CH_2)_3—Si(OC_2H_5)_2—O—Si(CH_3)(OC_2H_5)_2$,
$H_2N(CH_2)_3—Si(OCH_3)(CH_3)—O—Si(CH_3)(OCH_3)_2$,
$H_2N(CH_2)_3—Si(OCH_3)(CH_3)—O—Si(OCH_3)_3$,
$H_2N(CH_2)_3—Si(OC_2H_5)(CH_3)—O—Si(OCH_3)_3$,
$H_2N(CH_2)_2NH(CH_2)_3—Si(OCH_3)_2—O—Si(CH_3)(OCH_3)_2$,
$H_2N(CH_2)_2NH(CH_2)_3—Si(OC_2H_5)_2—O—Si(CH_3)(OCH_3)_2$,
$H_2N(CH_2)_2NH(CH_2)_3—Si(OC_2H_5)_2—O—Si(CH_3)(OC_2H_5)_2$,
$H_2N(CH_2)_2NH(CH_2)_3—Si(OCH_3)(CH_3)—O—Si(CH_3)(OCH_3)_2$,
$H_2N(CH_2)_2NH(CH_2)_3—Si(OCH_3)(CH_3)—O—Si(OCH_3)_3$,
$H_2N(CH_2)_2NH(CH_2)_3—Si(OC_2H_5)(CH_3)—O—Si(OCH_3)_3$,
cyclo-$C_6H_{11}NH(CH_2)_3—Si(OCH_3)_2—O—Si(CH_3)(OCH_3)_2$,
cyclo-$C_6H_{11}NH(CH_2)_3—Si(OC_2H_5)_2—O—Si(CH_3)(OCH_3)_2$,
cyclo-$C_6H_{11}NH(CH_2)_3—Si(OC_2H_5)_2—O—Si(CH_3)(OC_2H_5)_2$,
cyclo-$C_6H_{11}NH(CH_2)_3—Si(OCH_3)(CH_3)—O—Si(CH_3)(OCH_3)_2$,
cyclo-$C_6H_{11}NH(CH_2)_3—Si(OCH_3)(CH_3)—O—Si(OCH_3)_3$ and
cyclo-$C_6H_{11}NH(CH_2)_3—Si(OC_2H_5)(CH_3)—O—Si(OCH_3)_3$,
$H_2N(CH_2)_3—Si(OCH_3)_2—(O—Si(CH_3)_2)_{0-100}—O—Si(OCH_3)_2—(CH_2)_3NH_2$,
$H_2N(CH_2)_3—Si(OCH_2CH_3)_2—(O—Si(OCH_2CH_3)_2)_{0-100}—(O—Si(OCH_2CH_3)(CH_2)_3NH_2)_{1-100}—O—Si(OCH_2CH_3)_2—(CH_2)_3NH_2$,
$Si(OCH_2CH_3)_3—(O—Si(OCH_2CH_3)_2)_{0-100}—(O—Si(OCH_2CH_3)(CH_2)_3NH_2)_{0-100}—O—Si(OCH_2CH_3)_3$,
$H_2N(CH_2)_2NH(CH_2)_3—Si(OCH_3)_2—(O—Si(CH_3)_2)_{0-100}—O—Si(OCH_3)_2—(CH_2)_3NH(CH_2)_2NH_2$,
$H_2N(CH_2)_2NH(CH_2)_3—Si(OCH_3)_2—(O—Si(CH_3)_2)_{0-100}—(O—Si(OCH_3)(CH_2)_3NH(CH_2)_2NH_2)_{0-100}—O—Si(OCH_3)_2—(CH_2)_3NH(CH_2)_2NH_2$,
$HO—Si(CH_3)_2—(O—Si(CH_3)_2)_{0-100}—(O—Si(OCH_3)(CH_2)_3NH(CH_2)_2NH_2)_{0-100}—O—Si(CH_3)_2—OH$
and
cyclo-$C_6H_{11}NH(CH_2)_3—Si(OCH_3)_2—(O—Si(CH_3)_2)_{1-100}—O—Si(OCH_3)_2—(CH_2)_3NH$ cyclo-$C_6H_{11}$ and/or partial hydrolyzates thereof and/or compounds that can be produced by equilibration reactions with Si—O—Si— containing compounds, wherein particular preference is given to $H_2N(CH_2)_3—Si(OC_2H_5)_2—O—Si(CH_3)(OC_2H_5)_2$, $H_2N(CH_2)_3—Si(OCH_2CH_3)_2—(O—Si(OCH_2CH_3)_2)_{1-100}—(O—Si(OCH_2CH_3)(CH_2)_3NH_2)_{0-100}—O—Si(OCH_2CH_3)_2—(CH_2)_3NH_2$ or $H_2N(CH_2)_2NH(CH_2)_3—Si(OCH_3)_2—(O—Si(CH_3)_2)_{0-100}—(O—Si(OCH_3)(CH_2)_3NH(CH_2)_2NH_2)_{0-100}—O—Si(OCH_3)_2—(CH_2)_3NH(CH_2)_2NH_2$.

Organosilicon compounds (K2) composed of units of the formula (IV) are commercial products or can be prepared by methods common in silicon chemistry.

If required, component (K) can be dissolved in solvents (L) and/or organosilicon compounds (G).

The compositions according to the invention preferably comprise component (K) in amounts of 0.001 to 5 parts by weight, more preferably 0.001 to 2 parts by weight, and most preferably 0.01 to 1 parts by weight, especially 0.05 to 0.5 parts by weight, based in each case on 100 parts by weight of the total weight of components (A) and (B).

In addition to components (A), (B), (C), (D) and (K), the compositions according to the invention may comprise further substances which differ from components (A), (B), (C), (D) and (K), such as accelerators (E), auxiliaries (F), organosilicon compounds (G), stabilizers (H), solvents (L) and modifiers (M).

The accelerators (E) used in the compositions according to the invention may be any desired accelerators known to date for compositions crosslinkable radically and through condensation reaction.

Examples of optionally used component (E) are metal carboxylates such as bismuth(III) 2-ethylhexanoate, dioctyltin(IV) laurate, zinc(II) 2-ethylhexanoate, cobalt(II) 2-ethylhexanoate, copper(II) acetate, manganese(II) acetate, iron (II) acetate, iron(II) ethylhexanoate, barium(II) ethylhexanoate, zirconium(IV) 2-ethylhexanoate; metal acetylacetonates such as bismuth(III) acetylacetonate, zinc (II) acetylacetonate, aluminum(III) acetylacetonate, titanium(IV) bis(acetylacetonate) diisobutoxide; metal ethylacetoacetates such as titanium(IV) bis(ethylacetoacetate) diisobutoxide, titanium(IV) bis(ethylacetoacetate) diisopropoxide; metal alkoxides such as aluminum(III) ethoxide, titanium(IV) n-butoxide, titanium(IV) n-propoxide; and metal halides such as copper(I) chloride.

Component (E) optionally used is preferably cobalt(II) 2-ethylhexanoate or dioctyltin(IV) laurate.

If required, component (E) can be dissolved in solvents (L) and/or organosilicon compounds (G).

The component (E) optionally used can be either solid or liquid at 23° C. and 1000 hPa, wherein component (E) which is liquid at 23° C. and 1000 hPa is preferred.

If the compositions according to the invention comprise accelerators (E), the amounts are preferably 0.1 to 5 parts by weight, more preferably 0.1 to 1 parts by weight, based in each case on 100 parts by weight of the total weight of components (A) and (B). Preferably no accelerator (E) is used in the compositions according to the invention.

Component (F) optionally used in accordance with the invention preferably comprises pigments, dyes, odorants, heat stabilizers or flame retardants.

The optionally used pigments (F) are preferably inorganic pigments such as iron oxides (yellow, black, red), chromium (III) oxide, and titanium dioxide, carbon black; effect pigments for generating a metallic effect, such as flakes of gold, silver, copper, aluminum, silicon, mica, optionally coated for example with $FeTiO_3$, $Fe_2O_3$, $TiO_2$, mirror fragments, or liquid-crystal pigments for generating a goniochromatic color effect. The pigments (F) may be used in powder form or in dispersion in a suitable liquid, such as organosilicon compound (G) and/or solvent (L), for example. Furthermore, the pigments (F) may be used in the form of a surface coating applied to the coarse-grained fillers (D1).

The optionally used dyes (F) are preferably phthalocyanines or azo compounds

The component (F) optionally used preferably takes the form of pigments (F).

If the compositions according to the invention comprise auxiliaries (F), the amounts are preferably 0.01 to 20 parts by weight, more preferably 0.1 to 10 parts by weight, and especially 0.1 to 5 parts by weight, based in each case on 100 parts by weight of the total weight of components (A) and (B). The compositions 1 according to the invention preferably comprise auxiliaries (F), preferably pigments (F), whereas the compositions 2 according to the invention preferably do not comprise any auxiliaries (F).

The optionally used organosilicon compounds (G) are preferably those which are different from components (A) and (K), preferably those selected from silanes, substantially linear siloxanes and aliphatic saturated silicone resins, which are in each case free of basic nitrogen.

The substantially linear siloxanes (G) and the aliphatic saturated silicone resins (G) are preferably compounds which may be formed as a by-product in the preparation of component (A).

Component (G) preferably comprises silanes which are free of basic nitrogen.

The optionally used silanes (G) are preferably n-octyltrimethoxysilane, n-octyltriethoxysilane, (2,4,4-trimethylpentyl)trimethoxysilane, (2,4,4-trimethylpentyl)triethoxysilane, (2,4,4-trimethylpentyl)methyldimethoxysilane, (2,4,4-trimethylpentyl)methyldiethoxysilane, n-octylmethyldimethoxysilane, n-octylmethyldiethoxysilane, (cyclohexyl)trimethoxysilane, (cyclohexyl)triethoxysilane, cyclohexyl(methyl)dimethoxysilane, cyclohexyl(methyl)diethoxysilane, methyltrimethoxysilane, methyltriethoxysilane, dimethyldimethoxysilane, dimethyldiethoxysilane, tetraethyl silicate, phenyltrimethoxysilane, phenyltriethoxysilane, (methacryloxymethyl) (methyl)dimethoxysilane, (methacryloxymethyl) (methyl)diethoxysilane, (methacryloxymethyl)trimethoxysilane, (methacryloxymethyl)triethoxysilane, (methacryloxypropyl) (methyl)dimethoxysilane, (methacryloxypropyl) (methyl)diethoxysilane, 3-(methacryloxypropyl)trimethoxysilane, 3-(methacryloxypropyl)triethoxysilane, vinyltrimethoxysilane, vinyltriethoxysilane, 3-glycidoxypropyltrimethoxysilane, 3-glycidoxypropyltriethoxysilane, 3-(triethoxysilyl)propylsuccinic anhydride, bis(triethoxysilyl)ethane or bis(triethoxysilyl)ethene.

Optionally used silanes (G) are particularly preferably tetraethyl silicate, methyltriethoxysilane, vinyltrimethoxysilane, vinyltriethoxysilane, bis(triethoxysilyl)ethane, bis(triethoxysilyl)ethene or 3-methacryloxypropyltrimethoxysilane.

If the compositions according to the invention comprise component (G), the amounts are preferably 1 to 10 parts by weight, more preferably 1 to 5 parts by weight, based in each case on 100 parts by weight of the total weight of components (A) and (B). The compositions according to the invention preferably do not comprise component (G).

Preferred examples of optionally used stabilizers (H) are ketone acetals such as 2,2-dimethoxypropane; epoxides such as epoxidized soybean oil, glycerol diglycidyl ether, polypropylene glycol diglycidyl ether and (3-glycidoxypropyl) trimethoxysilane or radical scavengers such as 4-methoxyphenol, 4-tert-butyl-1,2-dihydroxybenzene, 2,6-di-tert-butyl-4-methylphenol, 2,6-di-tert-butyl-p-cresol, 4-tert-butylpyrocatechol and phenothiazine.

If the compositions according to the invention comprise stabilizers (H), the amounts are preferably 0.001 to 1 parts by weight, more preferably 0.005 to 0.5 parts by weight, based in each case on 100 parts by weight of the sum of components (A) and (B). The compositions according to the invention preferably comprise stabilizers (H).

Examples of optionally used solvent (L) are mono- and polyhydric alcohols such as methanol, ethanol, n-propanol, isopropanol, n-butanol, isobutanol, sec-butanol, 1,2-ethanediol, 1,2-propanediol, 1,3-propanediol, polypropylene glycol and polyethylene glycol; ethers such as methyl tert-butyl ether, di-tert-butyl ether and di-, tri- or tetraethylene glycol dimethyl ether; saturated hydrocarbons such as n-hexane, cyclohexane, n-heptane, n-octane and isomeric octanes, and mixtures of saturated hydrocarbons having boiling ranges between 60 and 300° C., of the kind obtainable under the trade names Exxsol™, Hydroseal® or Shellsol®; aldehyde acetals such as methylal, ethyl hexylal, butylal, 1,3-dioxolane and glycerol formal; esters such as ethyl acetate, n-butyl acetate, ethylene glycol diacetate, 2-methoxypropyl acetate (MPA), dipropylene glycol dibenzoate, dicyclohexyl phthalate and ethyl ethoxypropionate and carboxylic acids such as ethylhexanoic acid, n-octanoic acid or neodecanoic acid.

Preferred solvents (L) are carboxylic acids, carboxylic esters or saturated hydrocarbons, more preferably mixtures of saturated hydrocarbons having boiling ranges between 60 and 300° C. at 1000 hPa, ethylhexanoic acid, n-octanoic acid, neodecanoic acid or 2-methoxypropyl acetate (MPA).

If the compositions according to the invention comprise solvents (L), the amounts are preferably 0.1 to 1 parts by weight, more preferably 0.1 to 0.5 parts by weight, based in each case on 100 parts by weight of the sum of components (A) and (B). The compositions according to the invention preferably do not comprise solvent (L).

Examples of optionally used modifiers (M) are organic vinyl polymers such as polyvinyl acetates or polyvinyl acetate-co-vinyl laurates, which are soluble preferably at 25° C. and 1000 hPa in component (B).

If modifiers (M) are used, these are preferably used in the form of a homogeneous mixture in component (B).

If the compositions according to the invention comprise modifiers (M), the amounts are preferably 5 to 30 parts by weight, preferably 10 to 20 parts by weight, based in each case on 100 parts by weight of the sum of components (A) and (B). The compositions according to the invention preferably do not comprise any modifiers (M).

The compositions according to the invention are preferably those comprising
  (A) organopolysiloxane resin,
  (B) organic compound having at least one unit of the formula (II),
  (C) initiator,
  (D) filler,
  optionally (E) accelerator,
  optionally (F) pigment,
  optionally (G) organosilicon compounds,
  (H) stabilizer,
  (K) amine,
  optionally (L) solvent and
  optionally (M) modifier.

The compositions according to the invention are preferably those comprising
  (A) organopolysiloxane resin,
  (B) organic compound having at least one acrylate or methacrylate unit, (C) initiator,
(D) filler,
(E) accelerator,
optionally (F) pigment,
optionally (G) organosilicon compounds,
(H) stabilizer,
(K) amine,
optionally (L) solvent and
optionally (M) modifier.

The compositions 1 according to the invention are preferably those comprising
(A) organopolysiloxane resin,
(B) organic compound having at least one unit of the formula
(II),
(C) initiator,
(D1) fillers in amounts of 70 to 99 parts by weight, based on 100 parts by weight of composition 1,
optionally (E) accelerator,
optionally (F) pigment,
optionally (G) organosilicon compounds,
(H) stabilizer,
(K2) amine,
optionally (L) solvent and
optionally (M) modifier.

The compositions 1 according to the invention are more preferably those comprising
(A) organopolysiloxane resin,
(B) organic compound having at least one acrylate or methacrylate unit,
(C) initiator,
(D1) fillers in amounts of 80 to 95 parts by weight, based on 100 parts by weight of composition 1, with the proviso that mixtures comprising fine-grained and coarse-grained fillers are used as filler (D1), wherein the ratio by weight of fine-grained to coarse-grained fillers is from 5:1 to 1:5,
optionally (E) accelerator,
(F) pigment,
optionally (G) organosilicon compounds,
(H) stabilizer,
(K2) amine,
optionally (L) solvent and
optionally (M) modifier.

The compositions 2 according to the invention are preferably those comprising (A) organopolysiloxane resin,
(B) organic compound having at least one unit of the formula (II),
(C) initiator,
(D2) fillers in amounts of at least 40 to 90 parts by weight, based on 100 parts by weight of composition 2, with the proviso that filler (D2) consists of several layers of fibrous wovens, or several layers of fibrous laid scrims,
optionally (E) accelerator,
optionally (F) pigment,
optionally (G) organosilicon compounds,
(H) stabilizer,
(K) amine,
optionally (L) solvent and
optionally (M) modifier.

The compositions 2 according to the invention are more preferably those comprising
(A) organopolysiloxane resin,
(B) organic compound having at least one acrylate or methacrylate unit,
(C) initiator,
(D2) fillers in amounts of at least 40 to 90 parts by weight, based on 100 parts by weight of composition 2, with the proviso that filler (D2) consists of several layers of fibrous wovens or several layers of fibrous laid scrims,
optionally (E) accelerator,
optionally (F) pigment,
optionally (G) organosilicon compounds,
(H) stabilizer,
(K2) amine,
optionally (L) solvent and
optionally (M) modifier.

The compositions according to the invention preferably consist to an extent of at least 95% by weight, more preferably to an extent of 99% by weight, of components (A), (B), (C), (D) and (K) and optionally (E), (F), (G), (H), (L) and (M).

The compositions according to the invention preferably do not comprise any further components besides components (A), (B), (C), (D) and (K) and optionally (E), (F), (G), (H), (L) and (M) and also possibly the typical raw material impurities such as catalyst residues such as sodium chloride or potassium chloride; and also impurities in technical grade acrylate monomers and possibly reaction products of the components used which are formed during mixing or on storage.

The components used in accordance with the invention can be in each case one type of such a component as well as a mixture of at least two types of a respective component.

The compositions according to the invention can be prepared by mixing the individual components in any sequence and in a manner known to date.

The present invention also relates to a process for producing the compositions according to the invention by mixing the individual components in any sequence.

In the process according to the invention, filler (D) is preferably pre-mixed with amine (K), more preferably with amine (K2), optionally as a mixture with organosilicon compounds (G) and/or solvent (L). If filler (D) takes the form of a mixture of fine-grained and coarse-grained filler (D1), preferably only the coarse-grained filler (D1) is pre-mixed with amine (K), optionally as a mixture with organosilicon compounds (G) and/or solvent (L).

In the process according to the invention, the mixing can be carried out at temperatures in the range of preferably 10 to 50° C., more preferably in the range of 15 to 45° C., especially at temperatures of 20 to 40° C. Especially preferably, the mixing is conducted at the temperature which results on mixing at ambient temperaure from the temperature of the raw materials plus the temperature increase due to the energy input on mixing, wherein the mixture can be heated or cooled as required.

The mixing can take place at the pressure of the surrounding atmosphere, i.e. about 900 to 1100 hPa. It is also possible to carry out the mixing under reduced pressure, intermittently or continuously, for example at 30 to 500 hPa absolute pressure, in order to remove volatile compounds and/or air.

The process according to the invention can be carried out continuously, discontinuously or semi-continuously, the process preferably being carried out discontinuously.

In a preferred embodiment of the process (V1) according to the invention for producing compositions 1, filler (D1) is used as component (D).

In a preferred embodiment of the process (V1) according to the invention, fillers (D1) are pre-mixed with amine (K) and the optionally used components (F), (G) and (L) and subsequently components (A), (B) and (C), and also the optional components (E), (F), (G), (H), (L) and (M), are added and mixed in any sequence.

In a particularly preferred embodiment of the process (V1) according to the invention, the coarse-grained fillers (D1) are firstly pre-mixed with amine (K) and the optionally used components (F), (G) and (L), subsequently a mixture of components (A), (B) and (C) and the optional components (H), (E), (G), (L) and (M) are added thereto and mixed, and then fine-grained fillers (D1) are added thereto and mixed in.

In a preferred embodiment of the process (V2) according to the invention for producing compositions 2, component (D2) is used as filler (D).

In a preferred embodiment of the process (V2) according to the invention, components (A), (B), (C) and (K) and also optional components (E), (F), (G), (H), (L) and (M) are firstly mixed in any sequence to give a premix, and then component (D2), preferably wovens, laid scrims, knits or braids, is impregnated with the premix and optionally degassed. In the case of multi-layered wovens or laid scrims (D2), each layer individually or all layers together can be impregnated and degassed.

In a particularly preferred embodiment of the process (V2) according to the invention, components (A), (B), (C) and (K) and also optional components (E), (F), (G), (H), (L) and (M) are firstly mixed in any sequence to give a premix, and then injected into a mold cavity containing component (D2), preferably wovens, laid scrims, knits or braids.

In a particularly preferred embodiment of the process (V2) according to the invention, component (D2), preferably wovens, laid scrims, knits or braids, is firstly pre-treated with amine (K), optionally as a mixture with organosilicon compounds (G) and/or solvent (L), then a mixture of components (A), (B) and (C) and also optional components (E), (F), (G), (H), (L) and (M) is injected into a mold cavity containing component (D2) pre-treated with (K).

The compositions according to the invention can be molded into any shape by mechanical pressure at ambient temperature or optionally at elevated temperature.

In a preferred embodiment, the compositions 1 according to the invention are kneadable mixtures of putty-like consistency which are very highly viscous at room temperature, but which can be made to flow at appropriately high mechanical pressure.

In a further preferred embodiment, the compositions 1 according to the invention have the consistency of wet sand. They are kneadable, moldable, conveyable, for example on conveyor belts, and are sufficiently stable on storage until further processing.

The compositions 2 according to the invention are preferably moldable and are particularly preferably shaped and cured in a mold cavity or by a molding.

The compositions according to the invention or produced according to the invention crosslink by free radical polymerization and also optionally additionally by a condensation reaction with elimination of alcohol and possibly water. If the curing according to the invention additionally takes place by a condensation reaction, the optionally present silanol and/or organyloxy groups of resin (A) and also the other components and also optionally atmospheric moisture or humidity, which may adhere to the components, preferably react with one another, with the proviso that the condensation reaction can precede a hydrolysis step.

The mixtures according to the invention or produced according to the invention are preferably degassed prior to curing, wherein the degassing step is advantageously conducted during compaction, and subsequently more preferably being charged with inert gas having an oxygen content of below 5% by weight, particularly below 1% by weight.

The crosslinking according to the invention preferably takes place at temperatures in the range of 50 to 200° C., more preferably 70 to 160° C., and especially 80 to 130° C.

Furthermore, the compositions according to the invention can be crosslinked, preferably by direct and/or indirect contact with heated surfaces or in heated circulating air, more preferably in such a manner that the ingress of oxygen, for example from ambient air, is avoided as far as possible during the crosslinking. For this purpose, the compositions according to the invention can be allowed to crosslink by direct contact of the molding surface with heated surfaces, for example in closed chambers, and/or by covering the molding surface with a suitable airtight film and/or by introducing the compositions according to the invention into a mold cavity and subsequently heating indirectly, i.e. including the film and/or the mold cavity, with heated surfaces or hot circulating air.

Crosslinking may be accelerated by increasing the temperature such that the molding and the crosslinking can also be conducted in a combined step.

The crosslinking according to the invention is preferably effected at the pressure of the surrounding atmosphere, i.e. about 900 to 1100 hPa, but it can also be carried out at elevated pressure, i.e. from 1200 hPa to 10 MPa.

The compositions according to the invention can be used for all purposes for which prepolymers have also been used to date. The mixtures according to the invention are processed by known methods.

The present invention further relates to moldings produced by crosslinking the compositions according to the invention.

Moldings can be produced from the mixtures according to the invention, for example by the injection molding process which has long been known per se. For this purpose, the mixture is injected into an appropriate mold cavity with the aid of mechanical pressure. The mold is generally split into two and is sealed by a hydraulic press during the injection molding process. The mold is pre-heated to the desired temperature, whereupon on the one hand the composition flow is facilitated and on the other hand the curing is accelerated. At the end of the injection molding process, the mold is kept closed until the moldings have reached a consistency which allows non-destructive removal of the moldings. Mold cavities for test specimens are described, for example, in DIN EN ISO 10724-1:2002-04.

The moldings according to the invention obtained by crosslinking compositions 1 (moldings 1) preferably have a flexural strength of at least 20 MPa, more preferably at least 25 MPa, in particular at least 30 MPa, and especially at least 35 MPa, in each case at 23° C. Preferably, the moldings 1 according to the invention having a ratio by weight of fine-grained to coarse-grained fillers from 3:1 to 1:3 have a flexural strength at 23° C. of at least 30 MPa, more preferably at least 35 MPa; and especially of at least 35 MPa at 70° C.

The moldings 1 according to the invention are preferably artificial stones.

The present invention further relates to a process for producing artificial stones, characterized in that the compositions 1 according to the invention are molded and allowed to crosslink.

To produce artificial stones, the compositions according to the invention are firstly molded, wherein negative pressure is subsequently applied to avoid gas inclusions. Compression can already be carried out in this step by preferably vibrating the compositions according to the invention across the molds. This is followed by further compression of the composition by application of mechanical pressure. This compacting process, i.e. the compression optionally with vibration at a pressure of less than 50 mPa, preferably lasts 1 to 3 minutes. If the molding is cured in the mold, then at the same time as one of the preceding steps or subsequently, the mold is heated for a period of preferably 15 to 120 minutes to temperatures above room temperature, preferably at 50 to 200° C., more preferably at 70 to 160° C., and especially at 80 to 130° C. The molding is then removed from the mold. Alternatively, which is particularly preferred, the as yet uncured molding after completion of the molding, i.e. after the mechanical pressing, can be removed from the mold and in a subsequent separate step in a separate apparatus can be cured at the temperatures and times specified above. Subsequently—independently of the curing process—advantageously further storage at ambient temperature for a period of at least one hour takes place. The molding thus obtained can then be further processed by known methods, such as by grinding, polishing of the surfaces and trimming for example.

The artificial stones according to the invention preferably have a Shore D hardness of at least 75, more preferably of at least 80 Shore D, and especially of at least 85 Shore D, in each case at 23° C.

The moldings 2 according to the invention are preferably fiber composites.

The invention further relates to a process for producing fiber composites, characterized in that the compositions 2 according to the invention are molded and allowed to crosslink.

The compositions according to the invention have the advantage that they are stable on storage and have a consistency which can be adjusted according to requirements.

The compositions according to the invention have the advantage that they can be produced from readily accessible raw materials and in a simple manner.

The compositions according to the invention have the further advantage that they cure rapidly to give a solid composite.

The compositions according to the invention especially have the advantage that they have a good processing time of preferably more than 30 minutes, more preferably more than 45 minutes, and especially more than 60 minutes in a temperature range of 18 to 25° C., but still harden rapidly at elevated temperature, preferably at 80 to 130° C., and the moldings thus obtained already have high hardness and flexural strength preferably after 1 hour such that further processing (cutting, grinding, polishing) is possible.

The moldings according to the invention still exhibit no discoloration (yellow discoloration of light shades or lightening of dark shades) on exposure to UV irradiation compared to conventional moldings based on organic resins, when in the conventional systems, for example polyester resins dissolved in styrene, significant changes are already visible.

The moldings according to the invention also have the advantage that higher weathering stability is achieved by improved wetting of the fillers.

The moldings according to the invention have the advantage that they are stable to heat and have a reduced fire load compared to composite materials having purely organic binders.

In addition, the compositions according to the invention have the advantage that they are exceptionally suitable for producing artificial stones.

The compositions according to the invention have the advantage that no emissions harmful to health are formed during processing to the extent such as typically occur in polyester resins used according to the prior art which are dissolved in styrene.

The compositions according to the invention have the advantage that so-called composites can be produced having high flexural strength and at the same time high hardness.

The compositions according to the invention have the advantage that so-called composites can be produced having high flexural strength and at the same time high hardness even at elevated temperatures, such as 70° C. for example.

The compositions 1 according to the invention have the advantage that low amounts of amine (K) are sufficient to significantly increase the flowability thereof, i.e. to significantly reduce the viscosity at low shear rates, which makes them very easy to process, e.g. compactable. Also, addition of the amine (K) produces a greater depth of color.

The process according to the invention has the advantage that it is simple to carry out.

In the following examples, all data on parts and percentages refer to weight, unless stated otherwise. Unless stated otherwise, the following examples are carried out at a pressure of the surrounding atmosphere, i.e. at about 1000 hPa, and at room temperature, i.e. about 20° C. or at a temperature which occurs when the reactants are combined at room temperature without additional heating or cooling. All dynamic viscosity data detailed in the examples are intended to refer to a temperature of 23° C.

Measurement of the Flow Properties of Filled Compositions

In the context of the present invention, the viscosity is determined at low shear rates by the following procedure at a temperature, unless stated otherwise, of 23° C. and an atmospheric pressure of 1013 hPa. For the measurement, 20 g of composition 1 are applied by means of a truncated 100 ml plastic syringe to a polyethylene film using a circular template such that the amount has a diameter of 30 mm. After 30 minutes, the diameter of the sample is redetermined by reading off on the circular template from above to a precision of 1 mm. A greater diameter corresponds to a higher flowability or a lower viscosity of the mixture. The results of the tests are shown in Table 1.

Measurement of Flexural Strength

In the present invention, the flexural strength was measured according to ISO 178:2011-04 Method A with a test velocity of 2 mm/min at a supporting distance of 60 mm. The procedure in this case was as follows: test specimens were used of dimensions length×width×thickness=80 mm×10 mm×4 mm. The measurements were carried out on five test specimens in each case. The test specimens were produced by injection molding methods using a mold having exchangeable molding cavity plates in accordance with DIN EN ISO 10724-1:2002-04 as indicated in Example 1 and were cured under the conditions (temperature, time) specified in Example 1. During testing, the sample specimens were always inserted into the machine in the same way as they were positioned in the injection mold, i.e., with the bottom side downward. The value reported in Table 1 for the flexural strength in MPa corresponds to the respective mean value of the individual measurements, rounded to whole numbers in accordance with DIN 1333:1992-02 Section 4.

Measurement of Shore D Hardness

The Shore D hardness was determined according to DIN EN ISO 868:2003-10. The measurement was carried out using a Shore D durometer on plate sample specimens in dimensions of length×width×thickness=40 mm×40 mm×6 mm, these specimens having been produced by injection molding methods with a mold having exchangeable mold cavity plates in accordance with DIN EN ISO 10724-1: 2002-04 Form 2 as described in Example 1 and cured under the conditions (temperature, time) specified in Example 1. The Shore D hardness was measured on both the top and bottom sides of three test specimens in each case, giving a total of six measurement values. The value reported in Table 1 corresponds to the mean value from the individual measurements.

In the text below

Me is methyl radical, Vi is vinyl radical, Et is ethyl radical, Ph is phenyl radical, Ma is 3-methacryloyloxypropyl radical and Io is 2,4,4-trimethylpentyl radical.

Resin Mixture 1

In a heatable glass reactor with KPG stirrer, 2080 g of technical grade methyltrimethoxysilane (commercially available under the name Silan M1-trimethoxy from Wacker Chemie AG, Munich, Germany), 568.0 g of vinyltrimethoxysilane (commercially available under the name Silan V-trimethoxy from Wacker Chemie AG, Munich, Germany) and 48.0 g of hexamethyldisiloxane (commercially available under the name Öl AK 0,65 from Wacker Chemie AG, Munich, Germany) are heated to 50° C. and over the course of 10 minutes a mixture of 520.0 g of water and 4.00 g of hydrochloric acid (20% in water, 21.9 mmol of hydrogen chloride, commercially available under the name Salzsaure 20% zur Analyse from Bernd Kraft GmbH, Duisburg, Germany) is added and the mixture is stirred at reflux for 90 minutes. Subsequently, over the course of 2 minutes, the mixture is neutralized with 4.56 g of sodium methoxide solution (25% in methanol, 21.1 mmol of sodium methoxide, commercially available from SIGMA-ALDRICH Chemie GmbH, Taufkirchen, Germany).

176.0 g of 2-hydroxyethyl methacrylate (commercially available under the name Methacrylsaure-2-hydroxyethyl-ester from SIGMA-ALDRICH Chemie GmbH, Taufkirchen, Germany) are added, then the mixture is devolatilized at 100° C. and 50 mbar for 1 hour. 1571 g of a resin mixture are obtained with an organopolysiloxane of the composition $(MeSiO_{3/2})_{0.49}(ViSiO_{3/2})_{0.13}(Me(MeO)SiO_{2/2})_{0.25}(Vi(MeO)SiO_{2/2})_{0.06}(Me(HO)SiO_{2/2})_{0.02}(Me_2SiO_{2/2})_{0.01}(Me(MeO)_2SiO_{1/2})_{0.01}(Me_3SiO_{1/2})_{0.03}$, a number average molar mass Mn of 2100 g/mol and a weight average molar mass Mw of 11 940 g/mol. The mixture is homogeneously mixed with 232 g of butyl methacrylate (commercially available under the name Methacrylsäure-butylester from SIGMA-ALDRICH Chemie GmbH, Taufkirchen, Germany) and 93 g of 2-hydroxyethyl methacrylate (commercially available under the name Methacrylsäure-2-hydroxyethylester from SIGMA-ALDRICH Chemie GmbH, Taufkirchen, Germany). The dynamic viscosity of resin mixture 1 thus obtained is 230 mPa·s.

Example 1

To 70 g of coarse-grained quartz granules having an average grain size of 0.3 to 0.9 mm (commercially available under the name SB0,3-0,9T from Amberger Kaolinwerke Eduard Kick GmbH, Hirschau, Germany) are added 0.034 g of 3-aminopropyltriethoxysilane (commercially available under the name GENIOSIL® GF93 from Wacker Chemie AG, Munich, Germany) and this is mixed in a "Thinky Mixer ARV-310" planetary centrifugal mixer from Thinky for 30 seconds at 1500 revolutions/min at atmospheric pressure. Subsequently, the pre-treated granules are allowed to cool to 23° C.

17 g of resin mixture 1 are blended with 35 g of coarse-grained quartz flour having a dry sieving residue at a mesh size of 40 µm of 2% by weight (commercially available under the name Quarzmehl 16.900 from Amberger Kaolinwerke Eduard Kick GmbH & Co. KG, Hirschau, Germany) and mixing continued in the Thinky Mixer ARV-310 for 30 seconds at 1500 revolutions/min at atmospheric pressure, after which 70 g of the previously pre-treated coarse-grained quartz granules are added to the mixture and mixed in the Thinky Mixer ARV-310 for 30 seconds at 1500 revolutions/min at atmospheric pressure, wherein the mixture heats up to 40° C. Subsequently, 0.1 g of tert-butyl peroxybenzoate (commercially available under the name LUPEROX® P from SIGMA-ALDRICH Chemie GmbH, Taufkirchen Germany) is incorporated in the Thinky Mixer ARV-310 for 30 seconds at 1500 revolutions/min at atmospheric pressure, after which the mixture is briefly stirred manually with a spatula and then mixed again in the Thinky Mixer ARV-310 for 30 seconds at 1500 revolutions/min at atmospheric pressure. The mixture 1 thus obtained is left to stand for 30 minutes at 23° C. prior to determination of the flow behavior and is mixed for 90 seconds at 850 revolutions/min and 10 mbar in the Thinky Mixer ARV-310 prior to determination of the mechanical properties.

The test specimens for the mechanical measurements are produced using an oil-hydraulic press of type VSKO 75 from Lauffer GmbH & Co. KG. The press is fitted with a mold having exchangeable mold cavity plates according to DIN EN ISO 10724-1:2002-04, which enable production of test specimens at dimensions of length×width×thickness=80 mm×10 mm×4 mm (for testing flexural strength) or length×width×thickness=40 mm×40 mm×6 mm (for testing hardness). The mold is closed hydraulically with a closing force of 140 kN. The external dimensions of the mold in terms of length×width=450 mm×450 mm. The pressing ram has a diameter of 50 mm. To produce the test specimens, 100 g of the mixture described above are introduced and injected with a pressing force of 5 kN into the respective mold cavity, which is pre-heated at a temperature of 120° C. When the mold cavities are fully filled, the pressing force increases to 25 kN. At this point the hydraulic system is shut off. In the course of curing, the force slowly subsides, and amounts to 14 kN at the end of the overall pressing and curing process. After 30 minutes at 120° C., the mold is opened and the test specimens are withdrawn.

The test specimens thus obtained are stored at 23° C. for 24 h and 50% relative humidity and their mechanical properties are then examined at the temperatures stated in Table 1. The results are shown in Table 1.

Example 2

The procedure described in Example 1 is repeated with the modification that the coarse-grained quartz granules are not pre-treated with 3-aminopropyltrimethoxysilane, rather 3-aminopropyltrimethoxysilane is pre-mixed with resin mixture 1 in a Thinky Mixer ARV-310 for 15 seconds at 1500 revolutions/min at atmospheric pressure. The fine-grained quartz flour as described in Example 1, the non-pretreated coarse-grained quartz granules and tert-butyl peroxybenzoate are then successively mixed in.

The results are shown in Table 1.

Example 3

The procedure described in Example 1 is repeated with the modification that N-(2-aminoethyl)-3-aminopropyltrimethoxysilane (commercially available under the name GENIOSIL® GF91 from Wacker Chemie AG, Munich, Germany) is used in place of 3-aminopropyltrimethoxysilane.

The results are shown in Table 1.

Example 4

The procedure described in Example 1 is repeated with the modification that 2-(dimethylamino)ethyl methacrylate (CAS: 2867-47-2) (commercially available from SIGMA-ALDRICH Chemie GmbH, Taufkirchen, Germany) is used in place of 3-aminopropyltrimethoxysilane.

The results are shown in Table 1.

Example 5

The procedure described in Example 1 is repeated with the modification that triethanolamine (commercially obtainable from SIGMA-ALDRICH Chemie GmbH, Taufkirchen, Germany) is used in place of 3-aminopropyltrimethoxysilane.

The results are shown in Table 1.

Example 6

The procedure described in Example 1 is repeated with the modification that an amine-containing silicone oil (commercially available under the name WACKER® FLUID NH 15 D from Wacker Chemie AG, Munich, Germany) is used in place of 3-aminopropyltrimethoxysilane.

The results are shown in Table 1.

Comparative Example C1

The procedure described in Example 1 is repeated with the modification that methyltrimethoxysilane is used in place of 3-aminopropyltrimethoxysilane.

The results are shown in Table 1.

Comparative example C2

The procedure described in Example 1 is repeated with the modification that an amine-free silicone oil (commercially available under the name WACKER® WEICHMACHER X 345 from Wacker Chemie AG, Munich, Germany) is used in place of 3-aminopropyltrimethoxysilane.

The results are shown in Table 1.

Comparative example C3

The procedure described in Example 1 is repeated with the modification that an amine-free methylsiloxane (commercially available under the name SILRES® MSE 100 from Wacker Chemie AG, Munich, Germany) is used in place of 3-aminopropyltrimethoxysilane.

The results are shown in Table 1.

Comparative example C4

The procedure described in Example 1 is repeated with the modification that no 3-aminopropyltrimethoxysilane is used.

The results are shown in Table 1.

TABLE 1

| | Example | | | | | |
|---|---|---|---|---|---|---|
| | 1 | 2 | 3 | 4 | 5 | 6 |
| Diameter [mm] | 41 | 42 | 48 | 39 | 39 | 39 |
| Hardness (Shore D) at 23° C. | 89 | 88 | 88 | 90 | 87 | 86 |
| Flexural strength [MPa] at 23° C. | 49 | 50 | 47 | 53 | 46 | 45 |

| | Comparative example | | | |
|---|---|---|---|---|
| | C1 | C2 | C3 | C4 |
| Diameter [mm] | 34 | 32 | 30 | 33 |
| Hardness (Shore D) at 23° C. | 90 | 86 | 89 | 89 |
| Flexural strength [MPa] at 23° C. | 49 | 48 | 49 | 49 |

The invention claimed is:
1. A composition, comprising:
(A) at least one organopolysiloxane resin consisting of units of the formula

$$R_a R^1_b (OR^2)_c SiO_{(4-a-b-c)/2} \quad (I),$$

wherein
R are the same or different and are hydrogen or monovalent, SiC-bonded, optionally substituted hydrocarbon radicals free of aliphatic carbon-carbon multiple bonds,
$R^1$ are the same or different and are monovalent, SiC-bonded, optionally substituted hydrocarbon radicals having aliphatic carbon-carbon multiple bonds,
$R^2$ are the same or different and are a hydrogen or monovalent, optionally substituted hydrocarbon radicals,
a is 0, 1, 2 or 3,
b is 0 or 1 and
c is 0, 1, 2 or 3,
with the proviso that in formula (I) the sum of a+b+c≤3, in 15-30% of units of the formula (I) b=1, in at least 50% of the units of the formula (I) a+b=1, and in at most 10% of the units of the formula (I) a+b=3, based in each case on all siloxane units of the formula (I) in organopolysiloxane resin (A),
(B) organic compounds having at least one unit of the formula $$CR^3_2 = CR^3 - CO - Z - \quad (II),$$

wherein
$R^3$ are the same or different and are hydrogen, the cyano radical —CN, or a monovalent, optionally substituted hydrocarbon radical, optionally interrupted by heteroatoms,
Z are the same or different and are —O— or —NR⁵—
and
$R^5$ are the same or different and are hydrogen or a monovalent, optionally substituted hydrocarbon radical optionally interrupted by heteroatoms
(C) initiators,
(D1) fine grained fillers having particle sizes less than 200 μm and coarse grained fillers having particle sizes of at least 0.2 mm, and
(K) amines,
wherein the initiators (C) are organic peroxides, and
wherein the amines (K) are organic compounds (K1) which do not comprise any silicon atoms, or are organosilicon compounds (K2)

wherein the amines (K1) are amines of the formula

R⁷₃N  (III), where
- R⁷ are the same or different and are hydrogen or a monovalent or divalent hydrocarbon radical which may be interrupted by heteroatoms and are optionally substituted by hydroxyl groups, halogen atoms, amino groups, ether groups, ester groups, epoxy groups, mercapto groups, cyano groups or (poly)glycol radicals,
- with the proviso that in formula (III) at most two radicals R⁷ have the definition of a hydrogen atom, or an aliphatic cyclic amine, and amines (K2) are amines consisting of units of the formula

$R^8_k R^{10}_l Si(OR^9)_m O_{(4-k-l-m)/2}$  (IV), in which
- $R^8$ are the same or different and are monovalent, SiC-bonded organic radicals free of basic nitrogen,
- $R^9$ are the same or different and have the definition specified for radical $R^2$,
- $R^{10}$ are the same or different and are monovalent, SiC-bonded radicals having basic nitrogen,
- k is 0, 1, 2, or 3,
- l is 0, 1, 2, 3 or 4, and
- m is 0, 1, 2 or 3,
- with the proviso that the sum of k+l+m is less than or equal to 4 and at least one radical $R^{10}$ is present per molecule, and wherein said composition comprises component (K) in amounts of from 0.001 to 5 parts by weight, based on 100 parts by weight of the total weight of components (A) and (B).

2. The composition of claim 1, wherein in organopolysiloxane resin (A) the sum of the units of the formula (I) where $R^1$=vinyl radical is at least 80%, based on all units of the formula (I) where b=1.

3. The composition of claim 1, wherein the composition comprises component (B) in amounts of from 1 to 250 parts by weight, based on 100 parts by weight of component (A).

4. The composition of claim 1, further comprising fibers having a length up to 5 cm and semi-finished fiber products comprising fibers with a length of over 5 cm.

5. The composition of claim 1, wherein coarse-grained fillers have particle sizes in the range of 0.2 mm to 10 mm.

6. The composition of claim 1, wherein the weight ratio of fine grained fillers to coarse grained fillers is from 5:1 to 1:5.

7. The composition of claim 1, wherein the composition comprises component (K) in amounts of from 0.01 to 2 parts by weight, based on 100 parts by weight of the total weight of components (A) and (B).

8. A process for producing a composition of claim 1, comprising mixing the individual components in any sequence.

9. A molding produced by crosslinking a composition of claim 1.

10. A process for producing artificial stone, comprising introducing a composition of claim 1 into a mold and crosslinking the composition.

11. The process of claim 10, wherein prior to crosslinking, the composition is subjected to negative pressure after being introduced into the mold.

12. The composition of claim 1, wherein at least one filler is treated with at least one amine (K) prior to mixing with further components.

13. The composition of claim 1, wherein the organopolysiloxane resin (A) is liquid at 23° C.

14. The composition of claim 13, wherein the organopolysiloxane resin (A) has a dynamic viscosity at 23° C. of 1000 mPa·s to 100,000 mPa·s at 1000 hPa.

15. The composition of claim 1, wherein the filler (D1) constitutes from 70 to 99 weight percent of the composition.

16. The composition of claim 1, wherein the filler (D1) constitutes from 80 to 95 weight percent of the composition.

17. The composition of claim 1, wherein the filler (D1) constitutes from 87 to 92 weight percent of the composition.

* * * * *